US007694272B2

(12) United States Patent
Bronicki et al.

(10) Patent No.: US 7,694,272 B2
(45) Date of Patent: Apr. 6, 2010

(54) METHOD, A LANGUAGE AND A SYSTEM FOR THE DEFINITION AND IMPLEMENTATION OF SOFTWARE SOLUTIONS BY USING A VISUALIZABLE COMPUTER EXECUTABLE MODELING LANGUAGE

(75) Inventors: Youval Bronicki, Amikam (IL); Ofer Brandes, Kfar-Saba (IL); Yishay Raskin, Haifa (IL); Yariv Shaked, Tel Aviv (IL); Smadar Szekely, Tel Aviv (IL)

(73) Assignee: Sungard (Israel) Ltd, Herzliya (IL)

( * ) Notice: Subject to any disclaimer, the term of this patent is extended or adjusted under 35 U.S.C. 154(b) by 571 days.

(21) Appl. No.: 10/675,915

(22) Filed: Oct. 1, 2003

(65) Prior Publication Data
US 2004/0107414 A1    Jun. 3, 2004

(51) Int. Cl.
*G06F 9/44* (2006.01)
*G06F 3/00* (2006.01)
*G06F 3/048* (2006.01)

(52) U.S. Cl. .................. 717/109; 717/104; 717/105; 717/106

(58) Field of Classification Search ......... 717/104–109, 717/136, 148; 703/22; 700/83; 715/763, 715/853
See application file for complete search history.

(56) References Cited

U.S. PATENT DOCUMENTS

| 5,850,548 A | * | 12/1998 | Williams | 717/107 |
| 5,862,372 A | * | 1/1999 | Morris et al. | 717/109 |
| 6,064,409 A | * | 5/2000 | Thomsen et al. | 715/700 |
| 6,173,208 B1 | * | 1/2001 | Park et al. | 700/83 |
| 6,182,024 B1 | * | 1/2001 | Gangopadhyay et al. | 703/22 |
| 6,199,195 B1 | * | 3/2001 | Goodwin et al. | 717/104 |
| 6,199,198 B1 | * | 3/2001 | Graham | 717/105 |
| 6,225,998 B1 | * | 5/2001 | Okita et al. | 715/853 |
| 6,437,805 B1 | * | 8/2002 | Sojoodi et al. | 715/763 |
| 6,557,164 B1 | * | 4/2003 | Faustini | 717/107 |
| 6,564,368 B1 | * | 5/2003 | Beckett et al. | 717/113 |

(Continued)

OTHER PUBLICATIONS

Nitto et al.; "Deriving Executable Process Descriptions from UML"; ICSE'02, May 19-25, 2002, ACM; pp. 155-165.*

(Continued)

*Primary Examiner*—Insun Kang
(74) *Attorney, Agent, or Firm*—Law Offices of Edward Langer

(57) ABSTRACT

A software development platform, used to develop software applications substantially free of the need to write code. The platform includes a visualizable computer executable modeling language for the definition of software solutions. The platform also includes a visual modeling system comprising a visual modeling tool for users to develop software solutions using the modeling language, and a runtime engine software program that automatically executes the defined software solutions. The visualizable computer executable modeling language system enables defining each application by a set of: process models, each of which may contain any number of sub process model; input and output slots; data models, each of which may contain any number of sub data models; and flow rules applicable to connect pairs of slots, data models and sub-data models, thereby defining both data flow and process flow, wherein the sets of process models, slots, data models and flow rules are arranged in a structural hierarchy conforming to a set of rigid composition rules.

30 Claims, 22 Drawing Sheets

U.S. PATENT DOCUMENTS

| | | | | |
|---|---|---|---|---|
| 6,836,880 | B1* | 12/2004 | Dorn et al. | 717/120 |
| 7,069,517 | B2* | 6/2006 | Washington et al. | 715/763 |
| 7,185,316 | B1* | 2/2007 | Morris et al. | 717/116 |
| 7,240,328 | B2* | 7/2007 | Beckett et al. | 717/113 |
| 7,308,674 | B2* | 12/2007 | Fairweather | 717/103 |
| 2002/0066074 | A1* | 5/2002 | Jabri | 717/105 |
| 2002/0095653 | A1* | 7/2002 | Parr et al. | 717/105 |
| 2003/0222912 | A1* | 12/2003 | Fairweather | 345/763 |
| 2007/0089100 | A1* | 4/2007 | Morris et al. | 717/139 |

OTHER PUBLICATIONS

Burnett, Margaret; "Visual Programming"; Encyclopedia of Electrical and Electronics Engineering, John Wiley & Sons, NY; 1999; pp. 1-13.*

* cited by examiner

| Trade Details | (110) |
|---|---|
| Date | (111) |
| Buy/Sell Indicator | (112) |
| Quantity | (113) |
| Price | (114) |
| Currency | (115) |

Fig. 1a

METHOD, A LANGUAGE AND A SYSTEM FOR THE DEFINITION AND IMPLEMENTATION OF SOFTWARE SOLUTIONS BY USING A VISUALIZABLE COMPUTER EXECUTABLE MODELING LANGUAGE

FIELD OF THE INVENTION

The present invention relates to methods and languages for developing software solutions. More particularly, the present invention relates to a method, a language and a system for overcoming the need to write computer source code in order to develop software applications.

BACKGROUND OF THE INVENTION

Originally computers utilized low level technical notation and encoding. Gradually, more visually oriented and intuitive computer interfaces were developed. Such developments included the video monitor, use of icons and object-orientation incorporated in Visual Basic™, Visual C++ and Java™. The development of graphical user interfaces for developers began to reshape the programming process.

The concept of an application framework means that programmers start with working application code and basic user interface elements in place. Application development frameworks attempt to enable more simplified processing of information through the various levels of computer systems, so that application experts are not required to have programming skills in order to take a significant role in the development process.

Objects are software components made up of data elements and functions to manipulate these data elements. These can model virtually any real-world property of people, computers and systems, as well as abstract numbers and geometrical designs. Objects are often defined by creating "classes" that define the structure and behavior of object.

Objects can be designed to hide, or encapsulate, all, or a portion of, their internal data structure and internal functions. Object oriented programming (OOP) also allows a programmer to create an object that is a part of another object.

A common approach for software development is the use of modeling languages such as the Unified Modeling Language (UML) for the design phase, and the use of source code of a high-level computer language for writing the previously designed programs. This approach results in a slow implementation process and suffers from maintenance problems due to the gap between the descriptive nature of the modeling language used for the design and the language required for the programming, where source code is used. In addition, currently known modeling languages, such as UML, are themselves very complicated languages, the learning and mastering of which takes a very long time.

Another alternative is the use of distinct tools for the definition of process flows and for data manipulation. According to this approach, different problems will be solved differently, by different tools. This approach results in high system complexity and maintenance problems resulting from the separation of business logic across different systems. Typically, this hybrid approach is not used to completely implement new systems, but rather provides a hybrid solution for integrating between working systems. Integration of the working systems is performed by automatic sequencing, i.e. adding process logic invoking the working systems in a predefined order, and by providing data transformations, i.e. data manipulation elements that translate messages and data structures from a certain format to another.

Systems for visually defining executable process logic have been around for years. An important class of such systems is Workflow Management systems. Workflow Management systems began as systems for the management of manual work, and later evolved to handle automatic processes as well. Systems for visually defining executable data manipulation logic have also been around and have been used for application integration, e.g. mapping tools.

Recently, these two categories of Workflow and data manipulation have been converged into a new category called Business Process Management (BPM). BPM systems typically embody the aforementioned hybrid approach. The segregation that exists in these systems between the process logic and the data manipulation logic actually makes them inadequate for creating applications from scratch. BPM systems are not meant for complete definition of new applications, but are rather used for adding the "business process" layer on top of the "conventional" (hand-coded) applications.

Developments in the art include U.S. Pat. No. 5,850,548 by Williams, "System and Methods for Visual Programming Based on a High-Level Hierarchical Data Flow Model," issued Dec. 15, 1998. The assignee is Borland, who launched one of the first PC development environments, Turbo Pascal®, which made possible the commercial development of PC applications.

According to U.S. Pat. No. 5,850,548, a user constructs a program by selecting one or more components from a library, which displays components in a tabbed palette. Using a visual editor of the system, the user may drill-down into the internals of a component for modifying its logic. The user connects various components via the component "ports", which allow access to properties of the component. Components of the system may be nested within other components to an arbitrary level. Thus, high-level component manipulations are performed "visually," as illustrated in FIGS. 1-9B. However, detailed manipulations are achieved through standard programming techniques, as illustrated in FIGS. 10A-25B. The user must be a skilled programmer, as well as an application expert.

U.S. Pat. No. 6,282,699 by Zhang et al, "Code Node for a Graphical Programming System Which Invokes Execution of Textual Code," is also a hybrid visual/programming tool, wherein the graphical program is operable to invoke execution of textual code. U.S. Pat. No. 6,138,273 by Sturges, "Programmable Interpretive Virtual Machine," discloses an interpreter for a linear command stream. No visual application development is provided.

US20020138819A1 patent application by Hills, "Computer Programming Language to Describe and Encapsulate a Computer as a Set of Classes and Objects," that describes an object-oriented programming language method, encapsulates the structure and behavior of all software-visible objects making up a digital computer, as well as any abstract object normally described by an object-oriented programming language. The language disclosed is also a visual/programming hybrid.

U.S. Pat. No. 6,233,537 by Gryphon et al., "Workflow model language," issued May 15, 2001, discloses a modeling system for the visual presentation of business applications. It describes a systematic methodology for describing the business logic of systems by a visual modeling language capable of representing elements of the application in progressively finer levels of detail. The language disclosed is meant to serve multiple people specifying and designing together the functionality of a software system, and the design components can be visualized using drawing tools like VISIO or by drawing diagrams manually. U.S. Pat. No. 6,233,537, however, does not eliminate the need to implement the designed application, although it claims to describe business processes and business information in enough detail to construct a software implementation of a business model, if desired.

Therefore, there is a need for a system and a method that overcomes the limitations of the prior art, and provides for replacement of the need to write source code.

SUMMARY OF THE INVENTION

Accordingly, it is a principal object of the present invention to overcome the limitations of prior art and provide a method and a system that replaces the writing of source code for developing software applications, and to achieve real visualization of the solution itself.

It is still a further object of the present invention that instead of writing code, a model is created by the developer, wherein the model includes everything needed for defining the application in adequately precise terms.

It is a further object of the present invention that the visualizable computer executable modeling language used to define software solutions, hereinafter referred to as the modeling language, is easy to learn relative to currently known object-oriented modeling languages such as Unified Modeling Language (UML).

It is one further object of the present invention that no further coding is required once the solution is visually defined by the modeling language, wherein the language is rich enough and precise enough for a computer to execute an application model that is created using a computer with the appropriate graphic user interface (GUI).

It is one other object of the present invention that the modeling language exists independently of any specific visualization.

It is one more object of the present invention that the modeling language is sufficiently intuitive so that it can be understood by humans in a visual manner.

It is yet another object of the present invention that the modeling language supports the existence of hierarchical data structures within processes, allowing for direct access of each of the elements and sub elements of these data structures, without the need to retrieve the entire data structure from the process to extract any specific desired element.

It is yet a further object of the present invention that any flow rule of the modeling language may represent both data flow and process flow simultaneously.

A software development platform is disclosed, which is used to develop software applications free of the need to write computer source code. The platform includes a visualizable computer executable modeling language system for the definition of software solutions. The platform also includes a visual modeling environment for developing the software solutions by at least one user, and a runtime engine software program that automatically executes the software solutions at runtime.

The system of the present invention enables a user to easily and intuitively visually define systems and processes that comprise software solutions otherwise characterized by system analysts and then implemented by professional software programmers, laboriously writing numerous lines of source code in one of the known high level programming languages, such as Java, C++, C, Visual Basic, etc. Instead, according to the present invention, the user visually defines the software solutions in the modeling language by means of the modeling environment, which actually replaces the lengthy procedure of writing a computer program. To complete the cycle, the runtime engine of the present invention executes the solution defined by means of the modeling language, thereby automatically enabling computer execution.

Consequently, using the system of the present invention is cost and time effective in comparison to the prior art since it actually replaces the need of commercial companies to address software houses or other companies that provide unique solutions to unique problems. Instead, the users of the system of the present invention actually have a "tool" for defining solutions for numerous problems and needs from a variety of fields. The user of the system of the present invention does not need to be someone of special skill in computer programming or in any other field of computer science. Such a user will only have to undergo brief tutoring of approximately two weeks time, in which the user will learn how to operate and utilize the system of the present invention.

The method used for creating software solutions in accordance with the present invention comprises specifically defining the required solution using the modeling language and executing the modeling language definition by means of the runtime engine.

The modeling language can be used to define any process, including processes that involve human interaction. I.e. such processes include tasks, the performance of which requires human insight. The modeling language is most efficient when defining the details of automatic or semi automatic data manipulation processes, such as the processing of transactions in the financial industry, supply chain processes, such as orders management, inventory management etc., as well as accounting processes, customer relationship processes, etc.

Modeling Language

The present invention is based on a visualizable computer executable modeling language system for the definition and implementation of software solutions. The modeling language enables a user to fully visually define software solutions. In a preferred embodiment, the visual method used for developing the software solutions in accordance with the present invention resembles a combination of box diagrams and flow diagrams. The combination used gives an integrated view of data flow and process flow. From looking at the diagrams one can learn both the path in which data flows, i.e., from where it originates and to which destination it goes, as well as the order of execution of the various steps comprising the solution, i.e., which step is executed when. The combined diagram generated in accordance with the present invention defines precise and complete computer executable semantics, ready to be executed by the runtime engine. Other than defining and implementing the solution by means of the modeling language, there is no need to further implement the solution with conventional source coding.

In a preferred embodiment of the present invention the visual conventions of defining solutions in the modeling language comprise boxes of various shapes representing processes, arrows representing flows, and tree structures representing data.

The modeling language follows the following rules:

Processes may contain sub-processes;

Sub-processes can be repetitive. They are called for more than one time during the execution of the parent process. If a sub-process is repetitive, an instance thereof is created every time the parent process calls for its execution;

Slots are logical ports representing the inputs and outputs of a process. Each slot has a type that indicates the type of data that can be received as input or sent as output. Each process can have no slots at all, at least one input slot, at least one exit slot, or both input and exit slots, depending on the process' nature;

Processes can receive input through input slots and send raw or processed data through exit slots. In the context of a composite process, data can be transmitted through flows from an exit slot of one sub-process to the input slot of another, from an input slot of the parent process to an input slot of one of its sub-processes, or from an exit slot of one of its sub-processes to an exit slot of the parent process;

There are two kinds of input slots: triggers and asynchronous input slots. Triggers are used for the purpose of receiving data before a process starts, whereas asynchronous input slots are used for the purpose of receiving data during the execution of a process, i.e. after its initiation;

Input and exit slots that have no specified type are referred to as empty slots. Empty slots are used for communication between the processes when no actual data is sent, simply communicating timing information to synchronize the initiation of processes;

Input data sent to an input slot of a process can be divided into two kinds, mandatory and optional. A process that requires mandatory data for its initiation does not start before all mandatory input data is received;

A process terminates when it can no longer perform any work or when data is sent through an exit slot of the process that is marked as 'terminating;'

The existence of hierarchical data tree structures within processes is supported, including control of the order of components, selection between alternative components, multiple occurrences of components, etc;

A process can directly access each of the elements and sub elements on any level of a data tree located within the process. If a certain data element in any level of a data tree structure situated within a process is required, one does not have to retrieve the entire data tree from the process and only then extract the specific desired element from the data tree. According to the present invention, it is possible to access and use the desired data element directly; and Flow arrows are used to represent both data flow and process flow on the same diagram. A flow defines the order of execution of processes, the transition of data between processes, or both.

The modeling environment is one of the means by which the visual representation of modeling language models can be viewed. As aforementioned, definition of a software solution is performed by a user of the modeling environment using only the visual representation of the modeling language. Models of the modeling language also have textual representations, e.g. as Extensible Markup Language (XML) documents. This textual representation can be used to store models in computer files, for manipulation by the molding environment and for execution by the runtime engine.

Modeling Environment

The following section summarizes the modeling environment for defining and implementing software solutions defined in the modeling language, the second major element of the present invention.

The modeling environment comprises three main components: a Graphical User Interface (GUI) tool, or "Modeling Tool," which enables a user to visually create "models," which are modeling language definitions of the components of the developed solutions; a "Knowledge Base" consisting of a repository of models; and the runtime engine that interprets modeling language models and executes the solution they define. The runtime engine allows users of the modeling tool to test their models as part of the solution development process.

Users of the modeling tool can display, create, modify or test modeling language models. Users create and edit models using various GUI operations such as creating new process or data models through menu operations, adding components to process or data models by dragging models from palettes of pre-existing models, modifying attributes of models and of model components, etc. The modeling tool prevents the user from creating models that are inconsistent with the restrictions of the modeling language.

The Knowledge Base is a repository of formal representations of models that are provided by third parties or developed by the users of the modeling tool. The formal representation of a model should contain all the details of the model, to enable the modeling tool to retrieve the model for further usage and to enable the runtime engine to execute it. In accordance with the preferred embodiment of the present invention, XML based representations of models are used, but other formal representations such as binary files or database records are possible as well.

Runtime Engine

The following section briefly describes an exemplary embodiment of the runtime engine, the third major element of the present invention.

The runtime engine comprises two main components:
An interpreter that is responsible for processing data according to the logic defined in the models; and
A scheduler that is responsible for activating the interpreter at the correct time.

Both the interpreter and the scheduler are written in Java, and are composed of various classes. The interpreter and the scheduler can run within different threads in the same process in a single Java Virtual Machine (JVM), or as separate processes, each with its own JVM. The interpreter is the component responsible for the actual logic of the system. It receives input from the environment, i.e. external systems, and enacts any processing defined in the model as read from the model repository. The interpreter updates the state of processes in a run-time database and performs external actions, such as sending messages via the models' plug-ins. The scheduler is an auxiliary component that monitors a schedule table and activates the interpreter when the time comes to perform a certain action.

As an alternative to the runtime engine, a code-generator may be used to generate machine or source code from the models. The code-generator produces code implementing the application exactly as modeled.

For better understanding of the present invention and its components, the following is a specification of an exemplary embodiment of the visualization of the modeling language, the modeling environment and the runtime engine.

Additional features and advantages of the invention will become apparent from the following drawings and description.

BRIEF DESCRIPTION OF THE DRAWINGS

For a better understanding of the invention in regard to the embodiments thereof, reference is made to the accompanying drawings and description, in which like numerals designate corresponding elements or sections throughout, and in which:

FIG. 1a is an exemplary schematic illustration of a data model, wherein data is composed of data elements or fields, constructed in accordance with the principles of the present invention;

DETAILED DESCRIPTION OF PREFERRED EMBODIMENTS

Figure 1B:
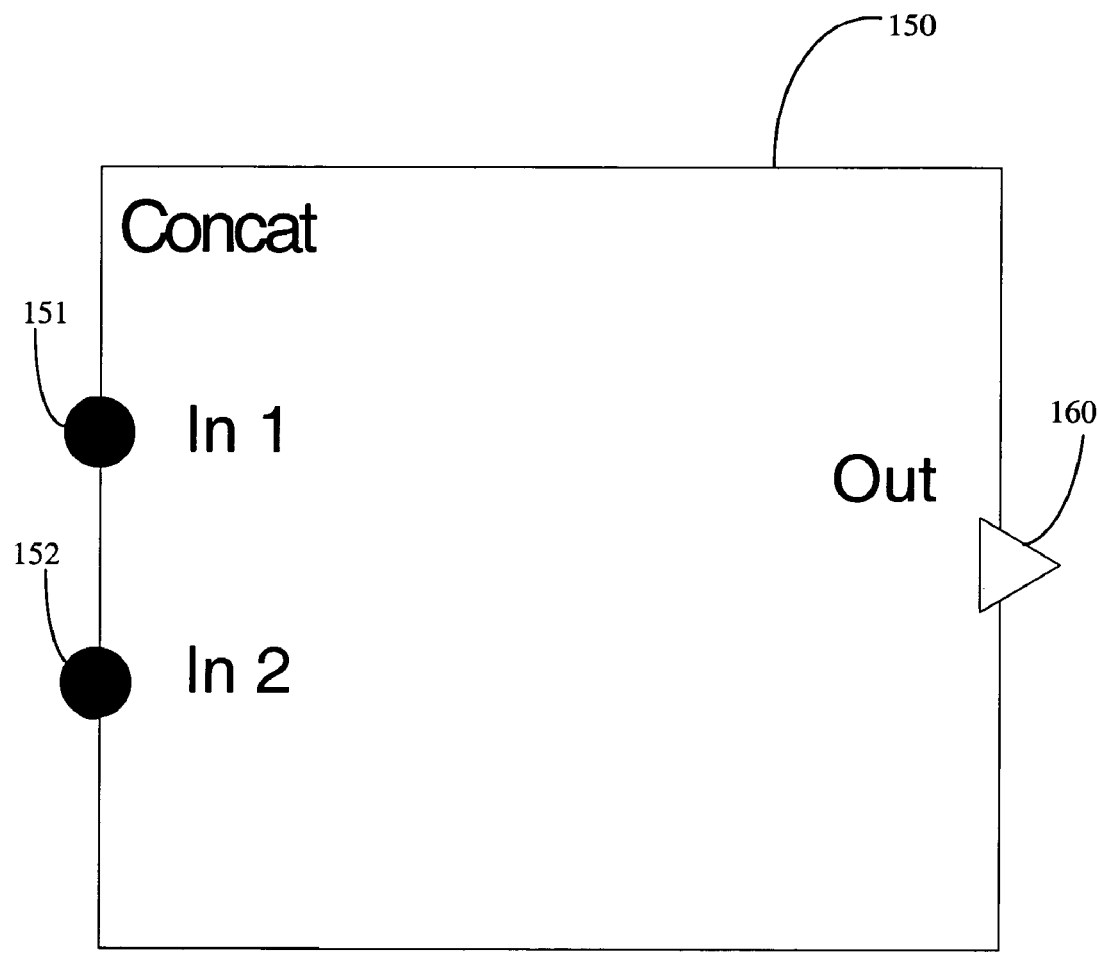
FIG. 1b is an exemplary schematic illustration of a simple process model diagram, an atomic action that concatenates two input strings and returns the result, constructed in accordance with the principles of the present invention.

The invention will now be described inconnection with certain preferred embodiments with reference to the following illustrative figures so that it may be more fully understood. References to like numbers indicate like components in all of the figures. The elements of the invention are described in increasing complexity in FIGS. 1 through 14. However, to get an overview of the invention, reference may be first made to FIGS. 15, 16 and 16a, wherein a real-life example best illustrates the usage of the present invention for replacing the writing of source code for developing software applications.

The system of the present invention can be described as comprising three major elements: a visualizable computer executable modeling language for the definition of software solutions; a modeling environment for visually defining the software solutions in the modeling language; and a runtime engine that executes solutions defined in the modeling language.

The term "visualizable" is used to denote a language that lends itself to having an intuitive visual representation. Actually, the modeling language of the present invention has been designed with the goal of enabling users to easily understand visual diagrams of models in the language, and the modeling tool extensively uses such diagrams. Nevertheless, the language itself does not impose any specific visualizations, and the visualization can be modified and improved without any change to the underlying language itself. The modeling language exists independently of any specific visualization.

Thus, the system of the present invention enables a user to easily and intuitively visually define systems and processes that comprise software solutions otherwise characterized by system analysts and then implemented by professional software programmers, laboriously writing numerous lines of source code in one of the known high level programming languages, such as Java, C++, C, Visual Basic, etc. By contrast, according to the present invention, the user visually defines the software solutions in the modeling language by means of the modeling environment, which actually replaces the lengthy procedure of writing a computer program. To complete the cycle, the runtime engine of the present invention executes the solution defined by means of the modeling language, thereby automatically enabling computer execution.

Modeling Language Usage

The modeling language provides means for describing business systems and processes. It also provides a precise semantics, enabling execution of the systems and processes exactly as defined by their models. The modeling language has an intuitive visual representation that is supported by the Modeling Tool and a formal, yet intuitive, textual, Extensive Markup Language (XML)-based representation. The modeling language is designed to be user friendly and to solve the main difficulties and complexities that have been encountered by prior art modeling languages.

The modeling language consists of data models and process models. Data models define hierarchical structures, represented as tree structures of data. Process models, represented as flow diagrams, define application logic and dynamic behavior.

Process models can be composed of various elements: process elements that represent sub-processes; data elements that store information; slots that act as logical gates for sending and receiving information; and flow rules, or simply "flows," that govern the flow of information and regulate the execution timing of sub-processes.

The basic semantics of the modeling language is defined by the following rules:

Flows represent data transmission between processes, order of execution of sub-processes, or both;

Processes can receive and send data through slots. There are several kinds of slots:

Trigger (synchronous input slot)—a slot from which data is received before the process starts. Trigger can be either mandatory or optional. A process can start only if all its mandatory triggers have received data. A trigger can be repetitive, meaning that more than one data tree can be received before the process starts;

Asynchronous Input Slot—a slot from which data can be received only after the process has started. An asynchronous input slot can be repetitive, meaning that a data tree can be received several times while the process is executed;

Exit (output slot)—a slot from which data can be sent out. An exit can be repetitive, meaning that a data tree can be sent out several times while the process is executed. If an exit is marked as 'terminating' the process ends immediately after the exit is reached. A terminating exit must not be repetitive because the first time the exit is reached the process ends; and Fail Exit—a slot that is used in case of a business exception. Fail is logically a special kind of terminating exit, which means that if an exception occurs and the fail exit is reached, then the process finishes;

Data is transferred through flows. Flow connects between various types of sources and targets, and each flow takes up one of the following combinations:

Source and target are both slots of any type;
Source is a slot and target is a node of a data model;
Source and target are both nodes of data models; and
Source is a node of data model and target is slot;

A process starts only after all its mandatory triggers have been charged. A Process ends when it has nothing left to do, or when a terminating exit is charged or when a fail exit is charged;

A Process can be atomic or composite. A composite process contains one or more sub-processes. An atomic process must not contain any sub-process;

An atomic process must have a plug-in, which is basically a piece of code implementing its functionality, which is executed as part of the process' execution; and A sub-process can be marked as repetitive, in which case several instances of it may be created at runtime. An instance of the sub-process is ready to start when all its mandatory triggers have received their inputs. The same is true for a non-repetitive sub-process instance.

Trace Events enable techniques for debug and trace during runtime. Trace Events are a set of logical events that are expected to occur during the execution of a top level model, i.e. a solution.

Reference is now made to FIG. 1a, which is an exemplary schematic illustration of a data model, wherein data is composed of data elements or fields, constructed in accordance with the principles of the present invention. Data models are used to represent pure data structures, e.g. Trade Details 110, as well as formatted structures, e.g. SWIFT MT 541 (not shown in FIG. 1a), a type of financial messages defined by the international SWIFT organization.

Data can be composed of data elements or fields. In FIG. 1a the fields of Trade Details 110 are: Date 111; Buy/Sell Indicator 112; Quantity 113; Price 114; and Currency 115.

FIG. 1b is an exemplary schematic illustration of a simple process model diagram, an atomic action named Concat, 150, that concatenates two input strings and returns the result, constructed in accordance with the principles of the present invention. The process concatenates two data fields received through its triggers (two input strings), 'In 1' 151 and 'In 2' 152, and returns the result 'Out' through the single exit 160.

Triggers and exits, as well as other kinds of slots described below, have a type indicating the type of data that can be received as Input or sent as output through them. In FIG. 1b the type of all three slots is String. String is one of the modeling language's built-in data models.

Processes are either synchronous (actions) or asynchronous. A Process of type Action represents a synchronous sequence of operations with well-defined beginning and end. Action cannot receive inputs after it has started.

An Atomic process is a process whose behavior is implemented by way of plug-ins. A plug-in is source code in a high-level programming language. Atomic processes have slots, like any process, which are logical ports representing the inputs and outputs of the process, and at least one plug-in. A plug-in implements predefined methods that support the life cycle of a process, including, but not restricted to, Start, Resume, etc.

The modeling language has built-in plug-ins that support many basic operations, and users can enrich the language by writing additional plug-ins for performing specific operations (e.g. wrapping an existing function, written in a high-level programming language). Such plug-ins are usually written by the user in the context of a specific solution.

Figure 2:
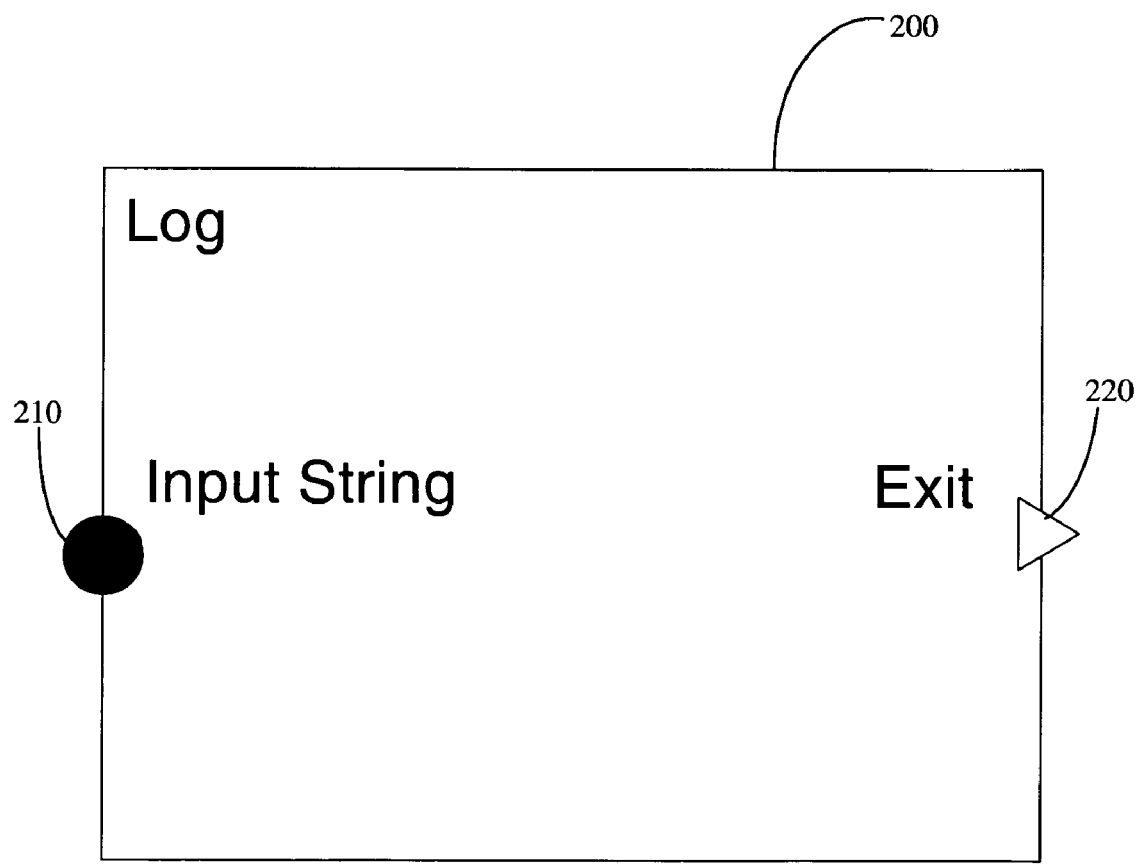
FIG. 2 is an exemplary schematic illustration of an atomic action model that receives a string, executes the a plug-in and exits, constructed in accordance with the principles of the present invention.

FIG. 2 is an exemplary schematic illustration of the Log atomic action model 200 that receives a string 210, executes the Log plug-in and exits at exit 220, constructed in accordance with the principles of the present invention. Log can be implemented by several different plug-ins, depending on the required implementation. A simple Log plug-in receives a string and writes it to the log table. The action of writing a string to the log does not generate a meaningful output, therefore no data is exposed through the Exit slot.

Figure 3:
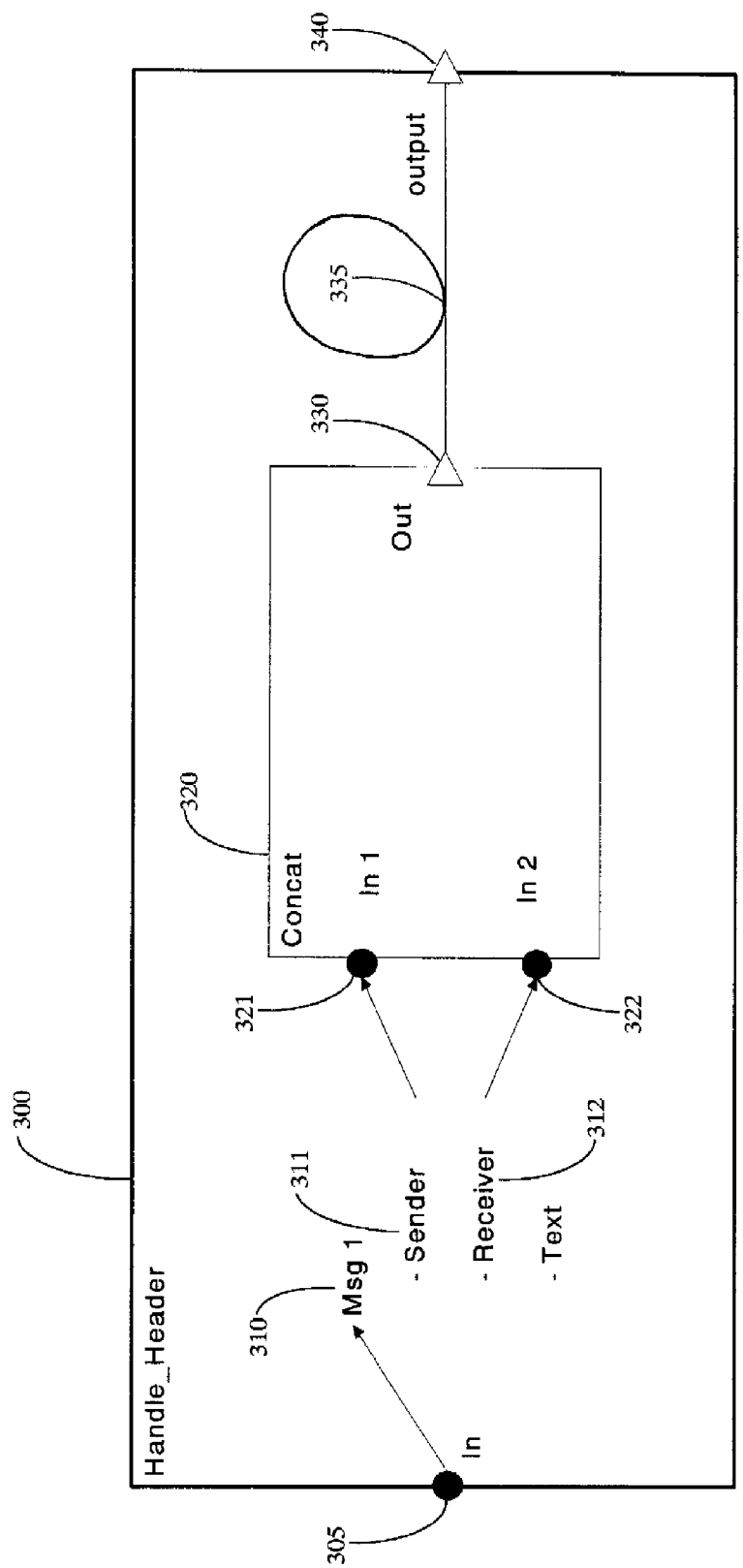
FIG. 3 is a schematic illustration of a composite process model that receives an input, concatenates two of its fields, and returns the result, constructed in accordance with the principles of the present invention.

FIG. 3 is a schematic illustration of Handle_Header, 300, which is a composite process model that receives an input In 305, concatenates two of its fields, Sender 311 and Receiver 312, and returns the result output, constructed in accordance with the principles of the present invention.

This composite process model has one trigger (In), one exit (output), one sub-process (Concat), one data element (Msg 1), and four flows. The composite process transfers data to and from its sub-process, Concat, using flows. Flows are graphically represented by arrows. Flows govern the transmission of data between sub-processes and data elements, and the order of execution of sub-processes within a process.

The behavior of a composite process is determined by the behavior of its sub-processes and the flows between them.

Handle_Header 300 receives its input and transfers it to an intermediate data element 'Msg 1' 310. The Sender field 311 of the input message is then transferred to 'In 1' 321, which is one of the triggers of Concat 320, and the Receiver field 312 to 'In 2' 322, which is the other trigger of Concat 320.

After receiving its two mandatory trigger inputs, the action of Concat 320 is initiated. The result of Concat 320 then flows through Out exit 330 and is sent 335 to the exit output 340 of Handle_Header 300. The data model that is exposed through Out exit 330 of Concat 320 and the data model that is exposed through the output exit 340 of Handle_Header 300 should both be of the same type.

Figure 4:
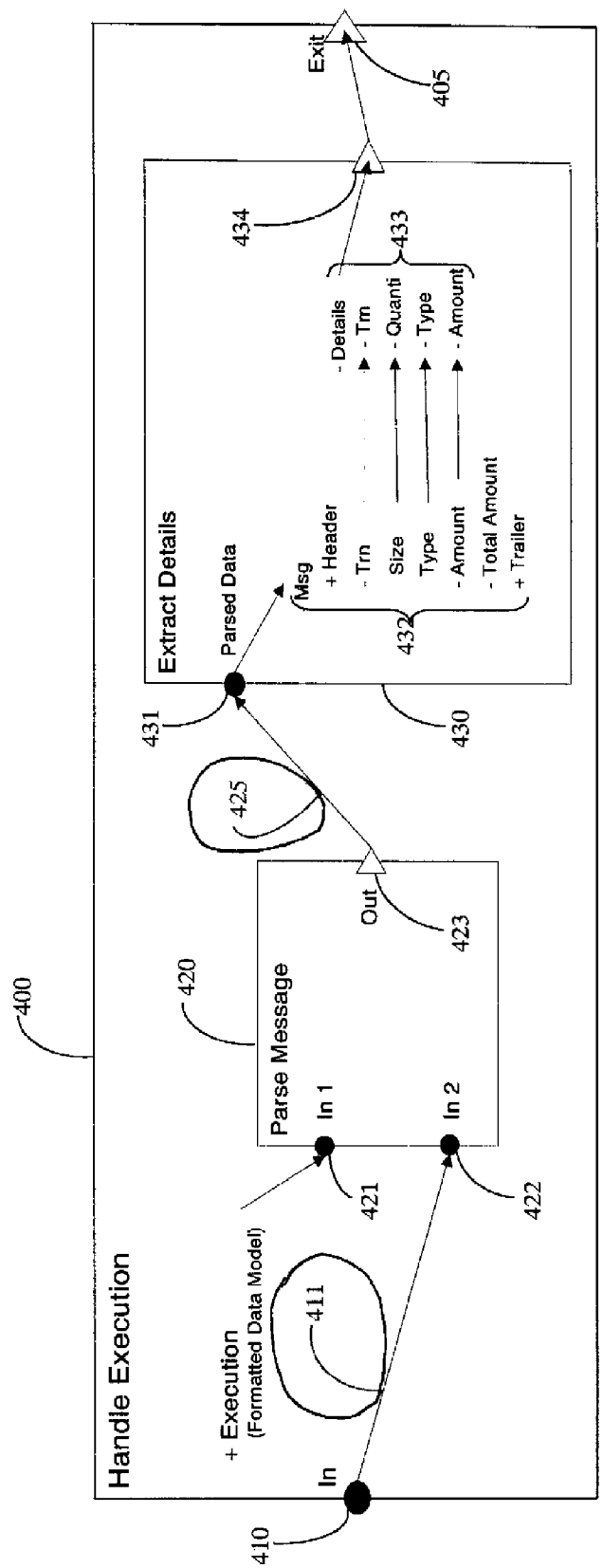
FIG. 4 is an exemplary schematic illustration of a data manipulation process model, a composite action model, which receives a message, parses it by invoking a sub-process and retrieves some fields from the parsed message by invoking a second sub-process, constructed in accordance with the principles of the present invention.

FIG. 4 is an exemplary schematic illustration of the Handle Execution 400 data manipulation process model, a composite action model, which starts with handling a received message, constructed in accordance with the principles of the present invention. Handle Execution 400 receives a string buffer In 410 containing the received message, and sends it 411 "as is" to a parsing action called Parse Message 420. Parse Message 420 receives a string buffer 'In 2' 422 (the text to be parsed) and a data model 'In 1' 421 (the text's format definition), and executes the parse plug-in which parses the string buffer 422 based on the formatting information of the data model 421. The output 423 of Parse Message 420 is sent out 425 as an "Extract Details" data tree message 432 containing the parsed data 431 (a composite tree structure).

The result of the parse action is transferred to Extract Details 430. Extract Details action 430 retrieves the important information from the data tree Msg 432 into a new compact data structure Details 433 containing only those data fields that are needed for further use. Details 433 is then outputted through exit 434, and then used to continue processing the trade after an Exit 405 from the Handle Execution process 400.

Figure 5:
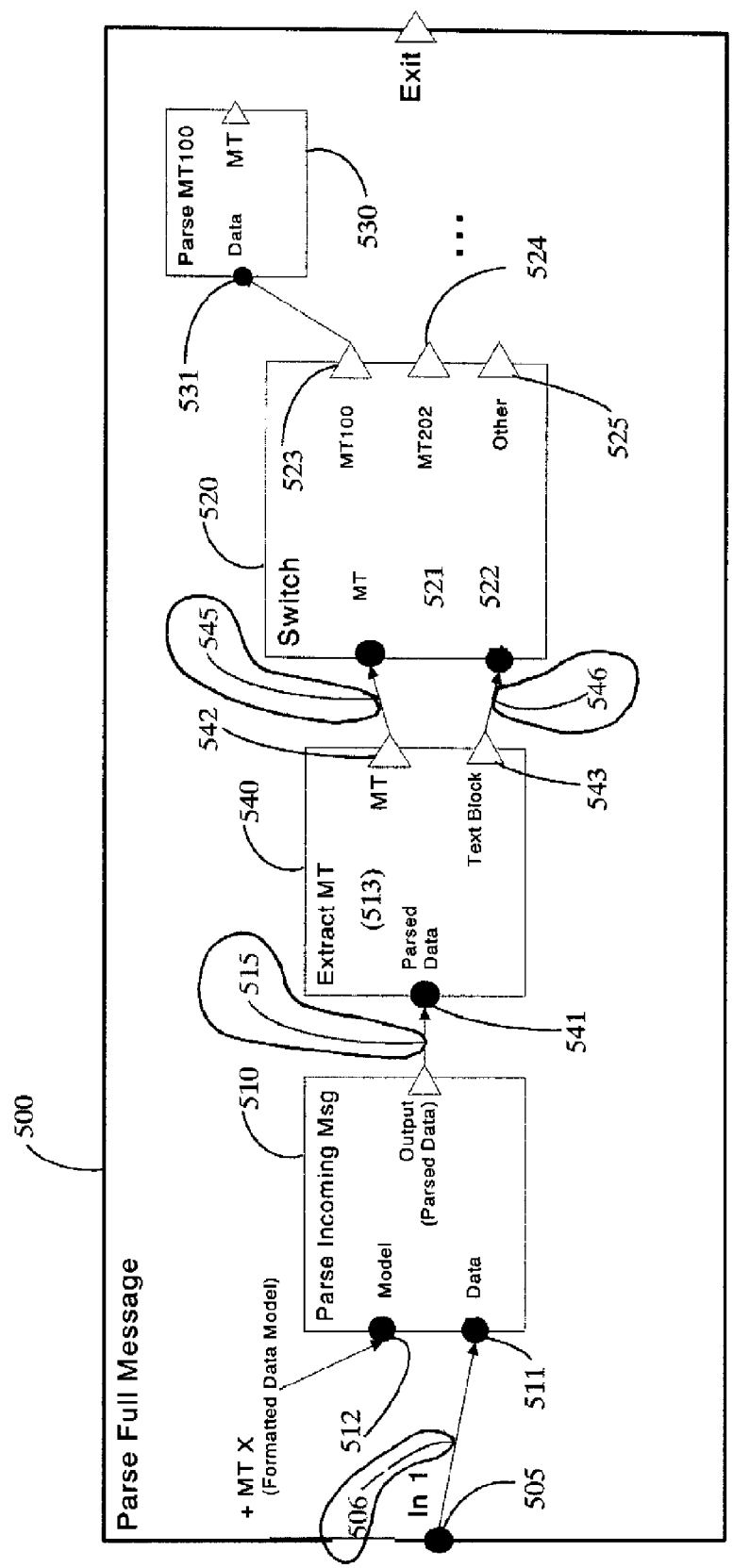
FIG. 5 is a schematic illustration of a composite process model, which illustrates the use of the Switch plug-in, constructed in accordance with the principles of the present invention.

FIG. 5 is a schematic illustration of a composite process model, 'Parse Full Message' 500, which illustrates the use of the Switch plug-in, and is composed of three atomic process models: Parse Incoming Msg 510, Switch 520, Parse MT100 530, and one composite process model: Extract MT 540, constructed in accordance with the principles of the present invention The Switch plug-in is used for directing an object to one of several optional paths, i.e. to determine how a process continues. The Switch plug-in receives two input data models, one representing a string and the other representing the object flowing through the process. It chooses the exit from which to expose the input object by comparing the input string to the choice value of each exit. If an exit with the same value is found, the object is exposed from it; otherwise the object is exposed from the default exit.

The composite process model Parse Full Message 500 has one trigger, 'In 1' 505, from which it receives a string buffer that is sent 506 to Parse Incoming Msg 510, which receives the buffer as Data 511 along with a data model Model 512 describing the structure of that buffer, and executes the Parse plug-in. The result of the parse atomic action 513, containing the parsed data, is transferred 515 to Extract MT action 540 as Parsed Data 541. Extract MT composite action 540 receives Parsed Data 541 and extracts pieces of information from it, i.e. the MT field content exposed through exit MT 542 and the text block field content exposed through exit Text Block 543, which are both transferred 545, 546 to Switch action 520.

Switch atomic action 520 receives the string MT 521 and a second input Data 522, and executes the Switch plug-in. Each exit slot of Switch action 520 has the special property Choice Value. The Switch plug-in compares the value of input string MT 521 to the choice value of each exit slot. If a match is found, e.g. with the choice value "MT100" of exit 523 or the choice value "MT202" of exit 524, the action exposes its input Data 522 through the matched exit; if not, the input Data 522 is exposed through the 'default' exit 525. A single match is allowed, e.g. with 'MT100' 523, in which case exposure is made to Data slot 531 of Parse MT100.

In this example the Flow arrows in FIG. 5 originate from the input slots themselves, and not from one of the data tree nodes as in previous examples, meaning that the whole data object that flows through the slot is transferred, whether it is a complex data structure or a leaf.

Figure 6:
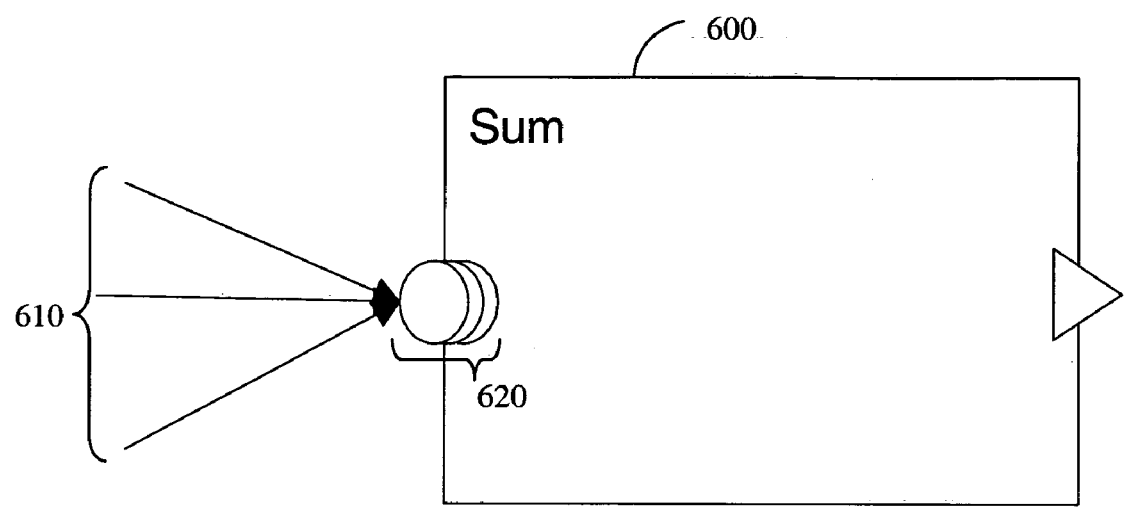
FIG. 6 is an exemplary schematic illustration of an atomic action model with a repetitive trigger through which it receives zero or more numbers, constructed in accordance with the principles of the present invention.

FIG. 6 is an exemplary schematic illustration of the Sum process model 600, which is an atomic action, which receives zero or more numbers 610 through its repetitive trigger 620 and executes its plug-in, constructed in accordance with the principles of the present invention. A generic Sum plug-in calculates the sum of the numbers received. A repetitive trigger can be mandatory, in which case one or more inputs must be received, or it can be optional, in which case 0 or more inputs are expected. Since the trigger 620 of the Sum action 600 is optional, then even if no input is received, the Sum process is invoked and executed. In this case the Sum plug-in returns the result '0'.

A repetitive slot is a slot that can receive more than one input instance at runtime. The repetitive nature of trigger 620 is represented in the diagram by multiple circles overlapping each other. A Repetitive input slot can be the target of a single flow that occurs a number of times, of multiple flows, or of any combination of these. At runtime, a process with a single repetitive trigger can start as soon as all flows that are targeted at the trigger, and should occur, are finished.

Figure 7:
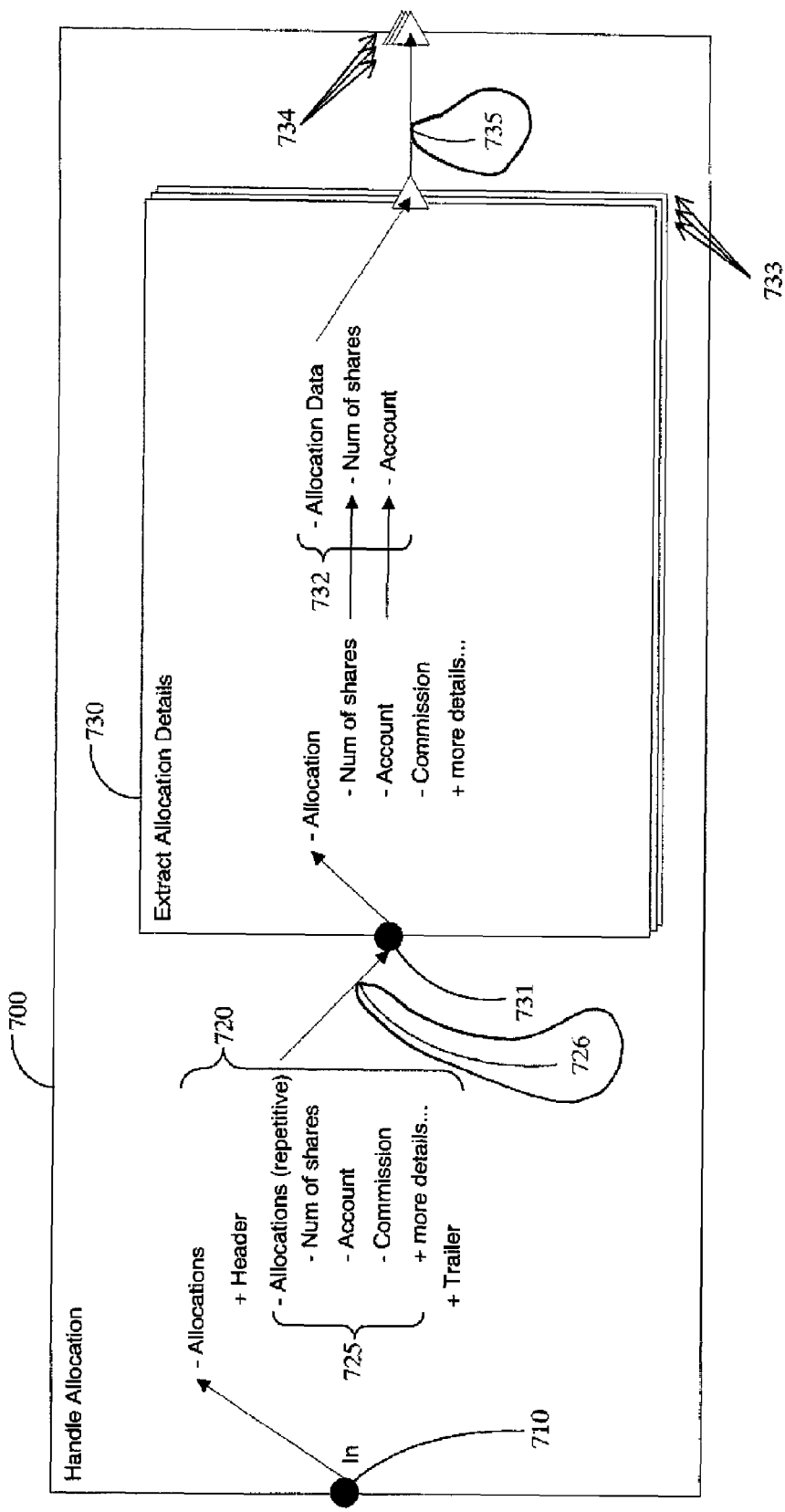
FIG. 7 is an exemplary schematic illustration of a repetitive action model whose instances are triggered by instances of a repetitive data model, constructed in accordance with the principles of the present invention.

FIG. 7 is an exemplary schematic illustration of the repetitive action model Extract Allocation Details, whose instances are triggered by instances of a repetitive data model, constructed in accordance with the principles of the present invention.

Handle Allocation 700 is a composite action model that receives an input data model In 710, which contains a repetition of Allocations 725. Allocations 725 are transferred, one by one, to instances of the Extract Allocation Details 730, which is a repetitive action. The flow 726 from Allocations 720 to the trigger 731 of the action Extract Allocation Details 730 occurs many times, according to the number of instances of Allocations 725. Each time the flow occurs, an instance of Allocations data model 725 is transferred to a new instance of Extract Allocation Details 730. A new instance of Allocation Data 732 is then created per each instance of Extract Allocation Details 730. This newly created instance of Allocation Data 732 is sent 735 through exit 733 of the current instance of Extract Allocation Details 730 to exit 734 of the parent process 730, thus the instance of Extract Allocation Details 730 finishes. The repetitive nature of Extract Allocation Details 730 is represented in the diagram by multiple rectangles overlapping each other.

Note that repetition is an attribute of a sub-process in a certain context. In other words, a repetition is an attribute of the "process element", the occurrence of a process model as a sub process model of a specific parent process model. In the example of FIG. 7, Extract Allocations Details 730 is repetitive in the context of Handle Allocation 700, but the same process model can appear as sub process model in another context, not necessarily as repetitive.

Figure 8:
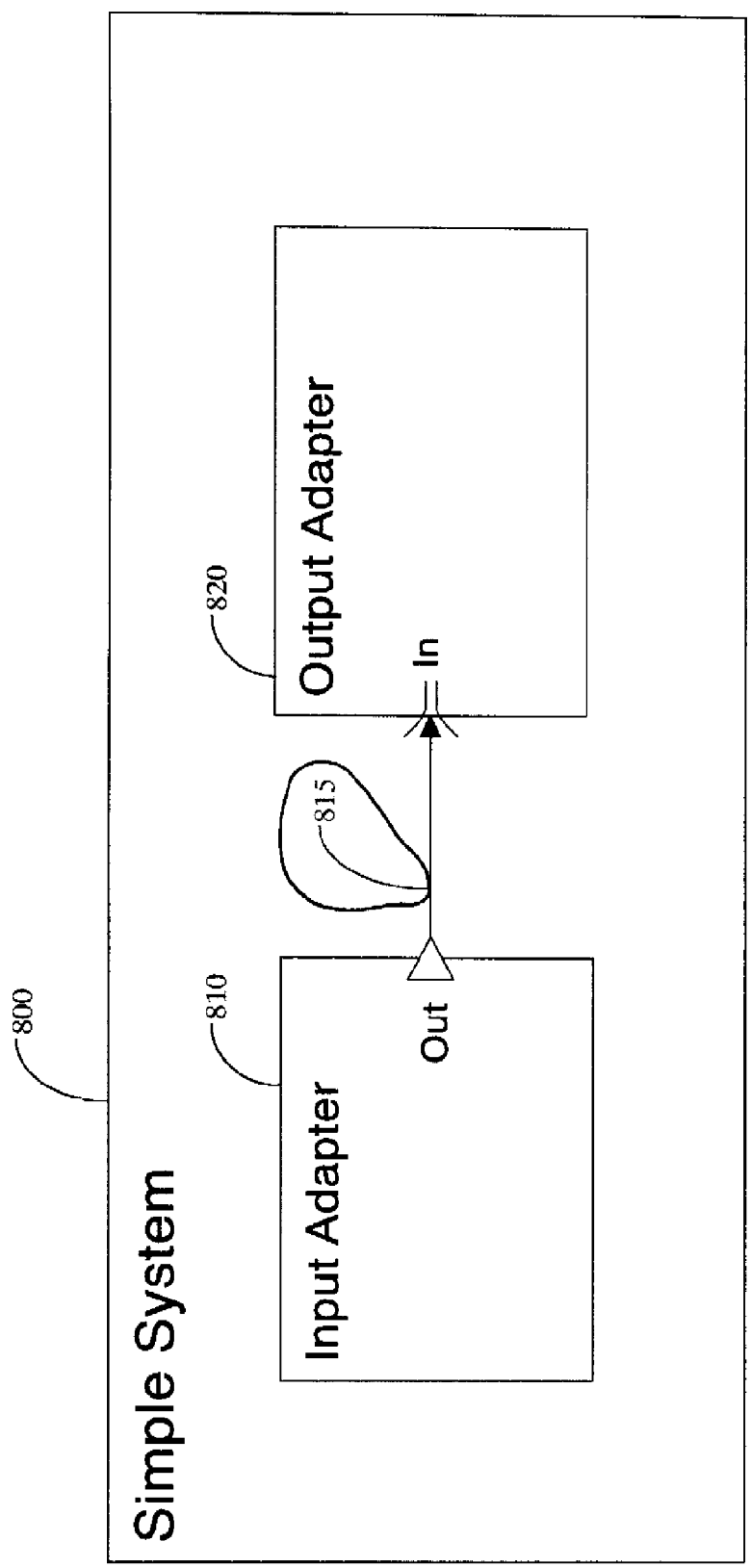
FIG. 8 is a schematic illustration of a system model, constructed in accordance with the principles of the present invention.

FIG. 8 is a schematic illustration of a system model, constructed in accordance with the principles of the present invention. A system is a continuous process with no triggers and without a life cycle, i.e., an "endless" daemon.

The system 'Simple System' 800 of FIG. 8 is composed of only input and output adapters. I.e., it only receives a message through the Input Adapter sub-process 810 and sends it 815 out through the Output Adapter sub-process 820. Input Adapter 810 and Output Adapter 820 are atomic systems. Messages sent 815 from Input Adapter 810 are received by Output Adapter 820 through the asynchronous input slot In 821. Unlike triggers, asynchronous input can receive data while a process is alive and running.

Figure 9:
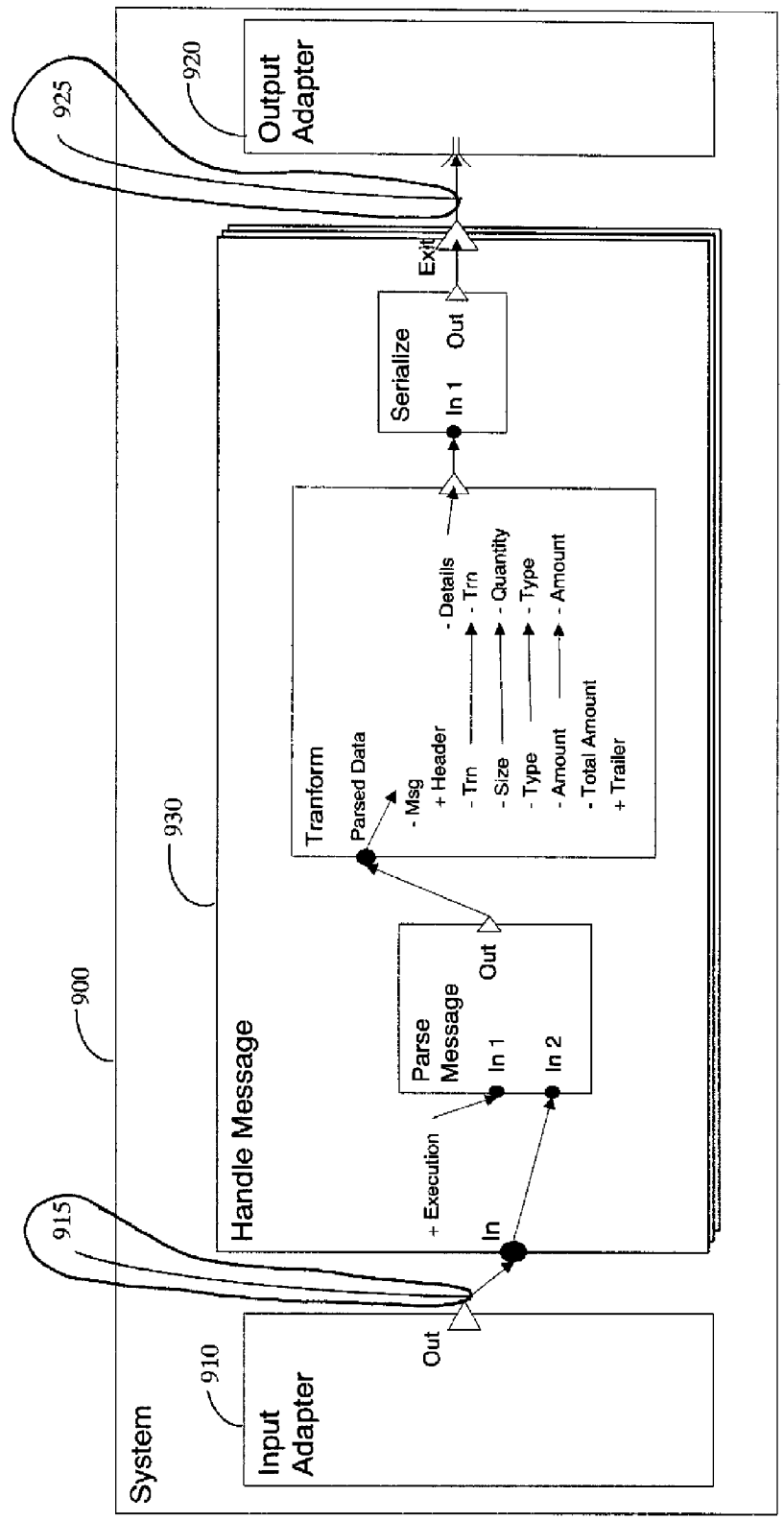
FIG. 9 is an exemplary schematic illustration of a small complete valid system model composed of input and output adapters and a main process model, constructed in accordance with the principles of the present invention.

FIG. 9 is an exemplary schematic illustration of a small complete valid system model 'System' 900 composed of an input adapter 'Input Adapter' 910, an output adapter 'Output Adapter' 920, and a main process model 'Handle Message' 930, constructed in accordance with the principles of the present invention.

A main process is a process which is a direct child of a system. Main processes must be repetitive because they receive an unpredictable amount of messages as time passes. Each message triggers an instance of the main process and is processed by it. In FIG. 9, each message coming from Input Adapter 910 invokes 915 a new instance of process Handle Message 930. Each instance of Handle Message 930 exposes a new output, which is transferred 925 to Output Adapter 920. This example does not contain exception handling, therefore if an exception occurs, for example, an incoming message fails parsing, then the runtime engine's default exception handling takes place.

Figure 10:
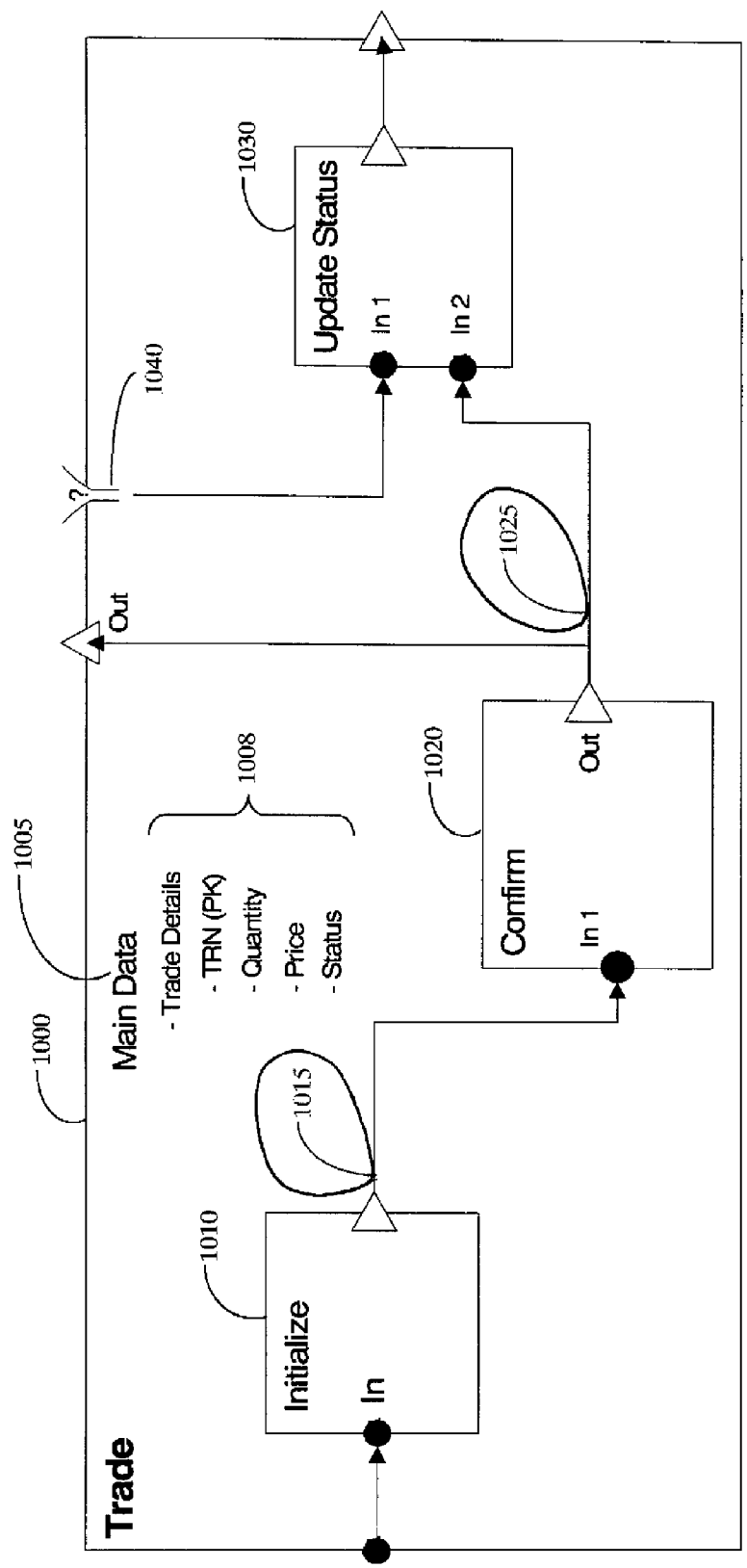
FIG. 10 is an exemplary schematic illustration of a typical asynchronous process model composed of a main data element and three sub-processes, constructed in accordance with the principles of the present invention.

FIG. 10 is an exemplary schematic illustration of a typical asynchronous process model Trade 1000, composed of a main data element 'Main Data' 1005, comprising Trade Details 1008, and three sub-processes, constructed in accordance with the principles of the present invention. The three sub-processes are Initialize 1010, which initializes Trade Details 1008, Confirm 1020, which prepares confirmation details to confirm that the execution message has been received 1015, and Update Status 1030, which updates the trade status in various phases during the lifecycle of the trade.

Update Status 1030 updates the status of the trade only after a confirmation message is received 1025. Since a confirmation is likely to be received after Trade 1000 is started, an asynchronous input slot is preferably used for that purpose. An asynchronous input slot, e.g. slot 1040, is the only kind of slot that enables a process to receive data after it has started. Trade 1000 finishes after Update Status 1030 is finished.

The main data of a process is identified with the process and contains information that is important for managing the data of the process and its sub-processes. The main data can be directly accessed by the process itself or by any of its sub-processes.

Figure 11:
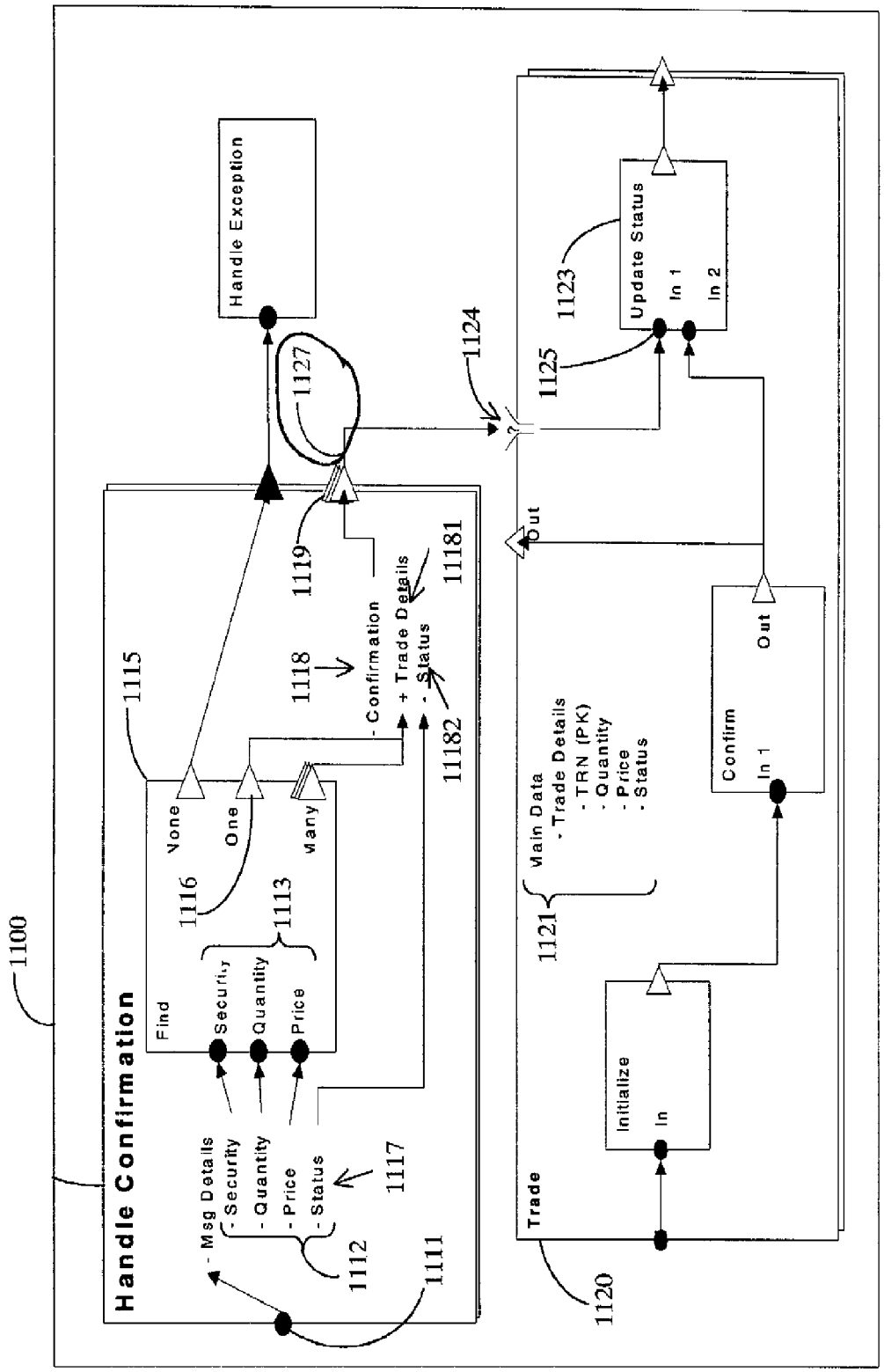
FIG. 11 is an exemplary schematic illustration of the matching mechanism, wherein a message is matched to an existing transaction in the system, constructed in accordance with the principles of the present invention.

FIG. 11 is an exemplary schematic illustration of a process model 1100 utilizing the matching mechanism wherein a message is matched to an existing transaction in the system, constructed in accordance with the principles of the present invention. A matching process is generally composed of a Find, which is an atomic synchronous process, and Addressing, which is achieved by applying an addressing clause to an asynchronous input slot.

In the process of matching, a message, e.g. a confirmation message, is matched to an existing transaction in the system, i.e. to an existing instance of an asynchronous process, which represents a transaction. In FIG. 11 a confirmation message 1111 enters the Handle Confirmation process 1110. Then some of its fields 1112 are used as triggers 1113 of the Find action 1115.

Triggers 1113 of Find action 1115 are necessarily fields that were modeled as Interesting Fields of the process model whose instances are searched ('Trade' in this case). Fields that are marked as interesting are kept in the database in an efficient way. Using all or some of the trade's interesting fields, Find action 1115 can efficiently look for an existing matching trade. The output 'One' 1116 of Find action 1115 is the main data 1121 of the found instance of Trade 1120 (if multiple instances are found, they are outputted through the other exit of Find, labeled 'Many').

Handle Confirmation process 1110 uses output 'One' 1116 of Find action 1115, and enriches it with the status 1117 from incoming confirmation message 1111. The output 1119 of the Handle Confirmation process 1110 is therefore the Confirmation data 1118, which is composed of main data 11181 retrieved by Find 1115 and additional information 11182 from the input message. Confirmation data 1118 is distributed to the matching instance, or instances, of Trade 1120 for the usage of an Update Status action 1123, which is a sub-process of Trade 1120.

The way Confirmation data 1118 is distributed 1127 is through the asynchronous input slot 1124 of Trade 1120. Input slot 1124 has an Addressing Clause attached to it, used as a matching condition (or distribution condition). Each instance of the output 1118 is distributed to a matching instance of Trade 1120, selected according to the addressing clause. The simplest distribution condition compares one of the fields of the data object received through input slot 1124 to the corresponding field in the main data 1121 of Trade 1120. If they match, the instance of Confirmation data 1118 goes through input slot 1124 and enters the matching instance of Trade 1120. As a result, the flow from input slot 1124 is executed and triggers the Update Status action 1123, which updates the trade status to indicate that a Confirmation Message 1118 has been received.

As mentioned, the matching mechanism is using the 'interesting fields' mechanism. A data model can contain 'interesting fields,' which are kept in the database and are associated with a process. When a modeler marks a field as interesting he/she must provide the name of the table column in which the interesting field will be stored. Based on this information, the fields can later be retrieved from the database and be queried. Interesting fields are mainly used for matching and monitoring purposes.

Addressing Clause is an optional attribute of an asynchronous input slot. An addressing clause is composed of an SQL query. At runtime the query is executed, and if a match is found, i.e. if the query has non-null results, the input is placed on the asynchronous input slot of each relevant process instance. The input can be placed on the asynchronous input slots of 0 or more instances of the process, i.e. there may be 0 or more matches.

Figure 12:
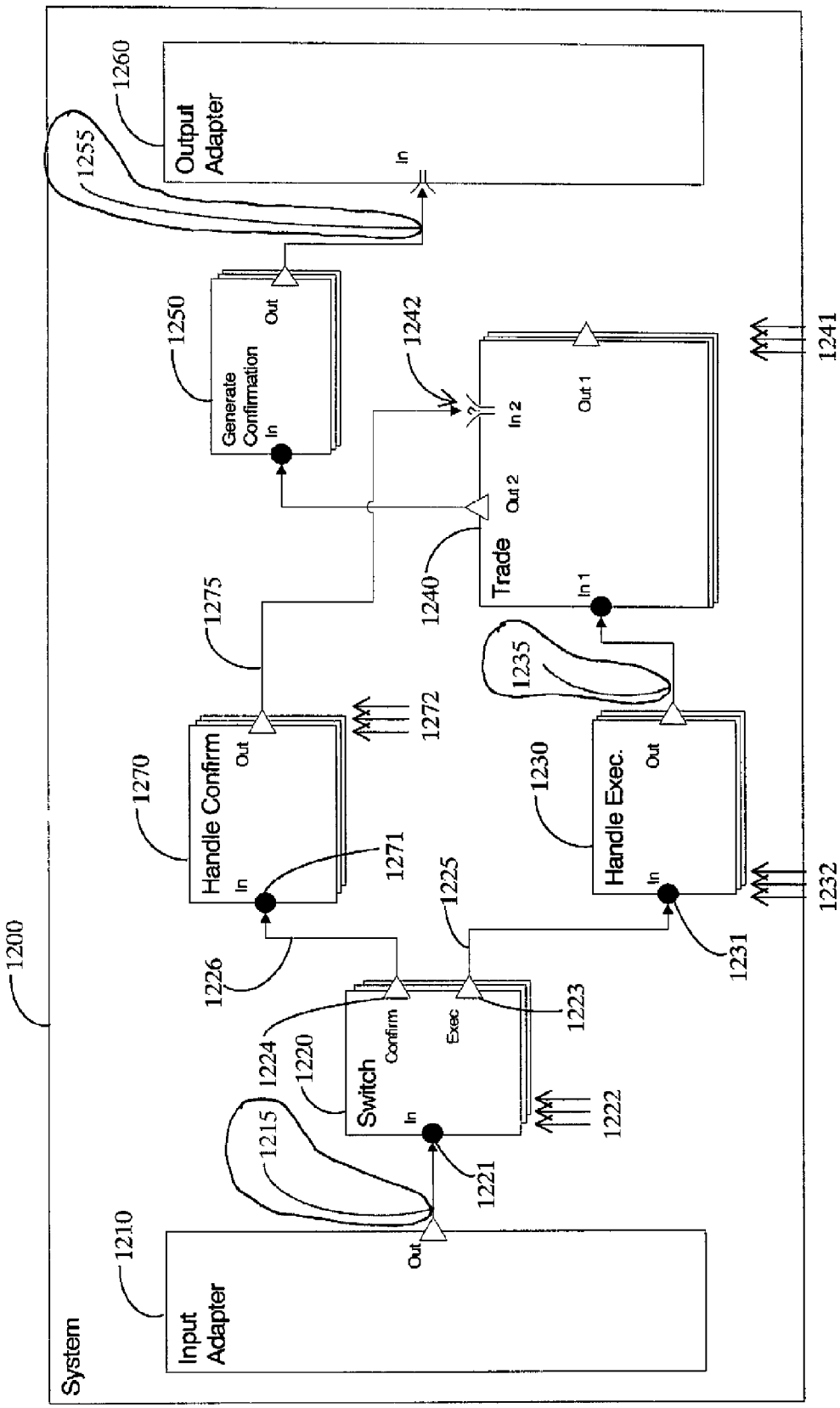
FIG. 12 is an exemplary schematic illustration of a complete system model, constructed in accordance with the principles of the present invention.

FIG. 12 is an exemplary schematic illustration of a complete system model System 1200, constructed in accordance with the principles of the present invention. When an execution message arrives 1215 at trigger 1221 through Input Adapter 1210, a new instance of the Switch process 1220 is created. The message exits through the Exec exit 1223 of Switch process 1220, and flows 1225 through the In trigger 1231 of 'Handle Exec.' process 1230. A new instance of 'Handle Exec.' 1230 is created. 'Handle Exec.' process 1230 extracts the relevant data from the message and sends it via the Flow 1235 to a new trade instance of the Trade process 1240. Then a trade confirmation message is created by the Generate Confirmation process 1250, and it is sent 1255 out via Output Adapter 1260.

Later on, when a confirmation message arrives trigger 1221 through Input Adapter 1210, again a new instance of Switch process 1220 is created. This time the message exits through the Confirm exit 1224 of Switch action 1220, and flows 1226 to the 'In' trigger 1271 of the Handle Confirmation process 1270. A new instance of Handle Confirmation process 1270 is created. Handle Confirmation process 1270 looks for an existing instance of the Trade process 1240. If such an instance is found, it is retrieved and sent out through exit 1273. It then flows 1275 to the asynchronous input slot 1242 of Trade process 1240, and links to the relevant instance of Trade process 1240. The relevant instance is chosen by the Addressing Clause, which is defined on the asynchronous input slot 1242 of Trade process 1240.

Figure 13:
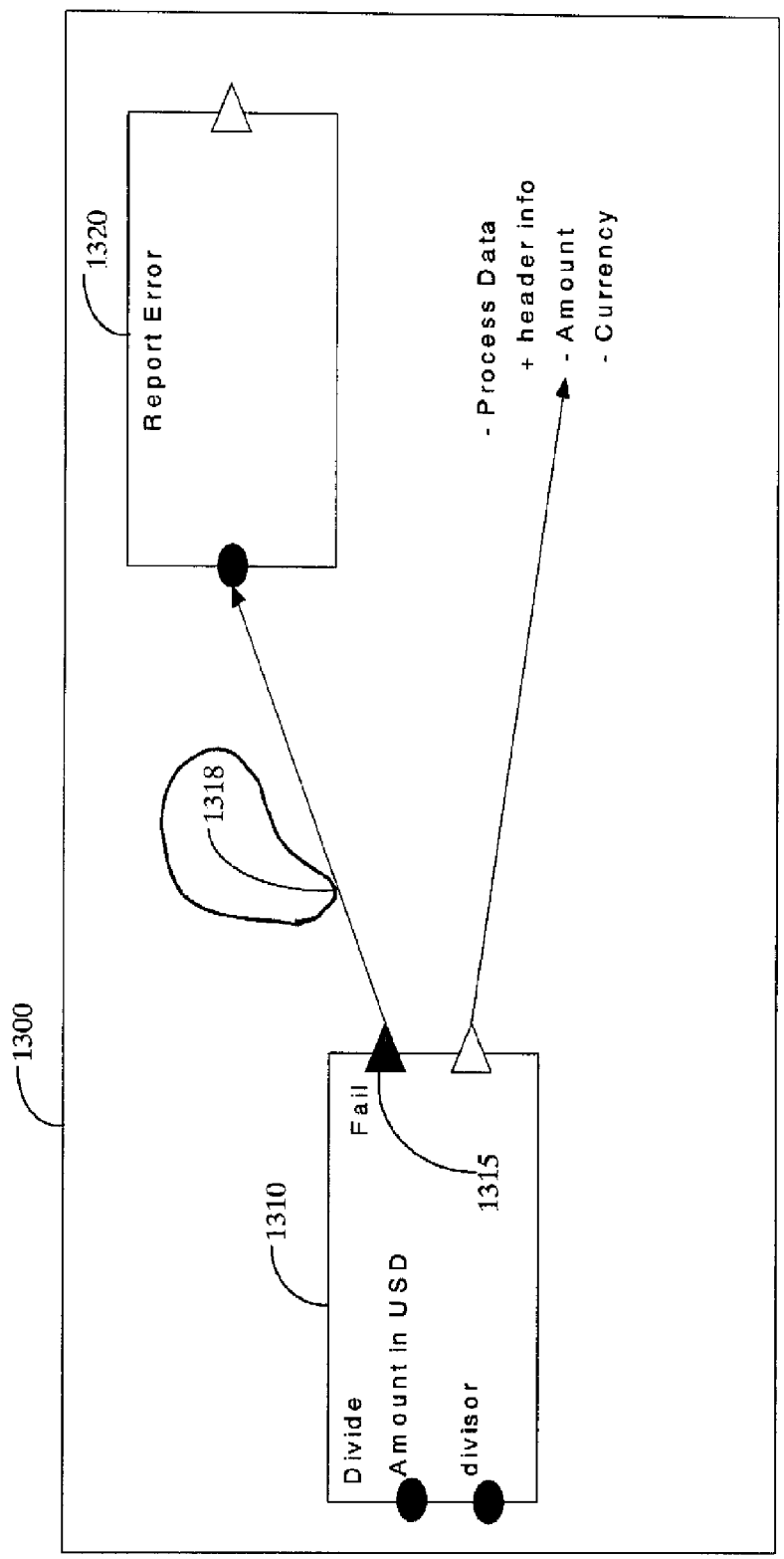
FIG. 13 is an exemplary schematic illustration of exception handling, herein achieved by modeling a special Fail exit and defining the flow from it, constructed in accordance with the principles of the present invention.

FIG. 13 is an exemplary schematic illustration of exception handling within a process model 1300, herein achieved by modeling a special fail exit 1315, and defining the flow from it, constructed in accordance with the principles of the present invention. Fail exit 1315 of the Divide action 1310 catches exceptions of pre-defined types, e.g. division by 0, which are considered as business exceptions, and thereafter the modeler is free to model the required exception behavior. Fail exit 1315 triggers 1318 a Report Error action 1320. If a process does not have a fail exit, and an exception occurs, the exception floats up to the nearest fail exit. If no fail exit is found, the runtime engine catches the exception and executes a default exception handling.

Modeling Language Components

With these examples in mind, it will now be easier to present the modeling language in a more formal manner.

The modeling language, its components and its semantics are described in details, as per a certain specific embodiments thereof, so that the reader can easily grasp the full extent of the language's capabilities, but these details are not be understood as a limitation to the invention as defined by the appended claims.

The modeling language is composed of basic entities named Models, which contain two types of other entities named Elements and Attributes.

Models are the basic entities in the modeling language. A model is the only entity in the modeling language that can be an autonomic unit. I.e. the model is independent and hence reusable as part of one or more other models. Alternatively, a model may only be a part of one another model, i.e. dependent. A model can be atomic, i.e. have no sub-models, or can be composite, i.e. have at least one sub-model.

There are two model types:
process model; and
data model.

A model of any type has the following attributes: ID; Type; Independent; Structure; Plug-In Class Name; and Read-Only.

A model of any type has the following elements: Data Element; and GUI Parameters.

Elements are components of models. A model's semantic is determined by the model type as well as the model's elements and attributes. Elements are by definition non-reusable, that is belong exclusively to the containing model. The existing elements are: Process Element; Data Element; Slot; Flow; and GUI Parameters. Each element has several pre-defined attributes: Role; Mandatory, which is applicable only to some kinds of slots; and Model.

An Attribute is an inherent characteristic of a model or an element. Any attribute is composed of a name and a value.

There are two types of attributes:
a pre-defined attribute is an essential part of the entity to which it belongs; the set of pre-defined attributes is constant, and a pre-defined attribute cannot be omitted; these attributes are common to all entities of the same type; and
a user-defined attribute is an additional attribute added by the user.

A process model is a hierarchical definition of a process. There are three types of process models:
Process model of type Action represents a synchronous sequence of operations with a well-defined beginning and end; an action cannot receive inputs after it has started, i.e. an action may not have Slots of type Asynchronous Input;
An Asynchronous Process represents asynchronous sequence of operations; an asynchronous process may receive inputs during its lifecycle; an asynchronous process has no constraints on the number and kind of Slots it may have; and
A Process model of type System represents a continuous process without a life cycle, i.e. it has no beginning or end. It is an "endless" daemon; a system has no triggers.

A Process model is composed of:
Slots: Triggers; Asynchronous Input Slots; Exits; Fail Exits; Flows;
Process Elements; and
Data Elements: the data element of the process model's main data; and data elements of intermediate data, including constants used in the process.

Process Models of all types have the following pre-defined attributes:

Type can have one of the following values, corresponding to the types of process models:
Action; Asynchronous Process; or System;
ID;
Plug-In Class Name; and
Structure, which has two valid values in the context of Process Model:
Atomic indicates that the process model has no process elements; an atomic process must have a plug-In Class Name; and
Composite indicates that the process model has one or more process elements.

There are several constraints on process models:
A process model may not have two elements with the same role, wherein role is unique in the context of the parent model;
A process model of type Action may contain process models of type Action only, i.e., not of type Asynchronous Process and System;
A process model of type Asynchronous Process may contain process models of type Asynchronous Process and Action, i.e., not of type System;
A repetitive process element, i.e., a process element whose Repetitive attribute has the value 'true,' may not refer to a process model that has a repetitive trigger;
A repetitive process element must refer to a process model that has at least one mandatory trigger;
A process element that refers to a process model of type System is never repetitive;
If a process model has an explicit fail exit, it preferably is a source of at least one flow;
A process model of type System cannot contain a trigger; and
An atomic process model must have a plug-in.

A Data Model contains semantic and optionally syntactic details about a piece of information that is expected to be used in a process. A data model is composed of Data Elements.

A data model has the following pre-defined attributes:
ID;
Structure, which may have one of the following values: Leaf; Concatenation; Collection; and Selection;

Type, which may have one of the following values: Regular; XML—if this data model also contains XML—formatting information; Non-XML—if this data model contains non-XML, formatted information; Character Group—if this data model represents a character group; and Structure—if this data model represents a structure;

Visible—if this data model contains interesting fields;

XML Node Type, which may have one of the following values: Root; Element; XML Declaration; DOCTYPE Declaration;

Initial Value—the actual value initially assigned to instances of this data model;

IsConstant—'true' if the initial value represents a constant value that cannot be changed later; and 'false' otherwise, which is the default value;

Format Descriptor—Definition of the way data instances of this data model should be formatted;

Minimum Length/Maximum Length—the minimum and maximum length in characters of data instances of this data model;

Character Group—a reference to a data model of type 'Character Group' defining the set of characters that may appear in instances of this data model; and Structure—a reference to a data model of type 'Structure,' defining the syntactical characteristics of formatting data instances of this data model.

Two types of data models have a compulsory predetermined construction:
Data model of type 'Character Group'—a leaf data model; and
Data model of type 'Structure'—contains data elements with the following roles:
  Empty Field Policy;
  Left Padding;
  Right Padding; and
  Separator, which refers to a data model which contains data elements with the following roles: Separator String; Separator Right Context; Is Right Context Negative; Separator Left Context; and Is Right Left Negative.

Modeling Constraints on data models are as follows:
Data Model of type Leaf cannot contain any data element, and therefore cannot contain any other data model; and
Non Leaf Data Models may not have a constant value or initial value.

There are two types of elements: process elements; and data elements.
A Process Element, which describes the usage of a sub process model within a specific parent model, has the following attributes: Role; Repetitive; and Model.
A Data Element, which describes the usage of a data model within a process model or as a sub data model of a parent data model, has the following attributes: Role; Mandatory; Max Occurrences; and Min Occurrences.

In addition, a data element has the following pre-defined attributes, which are only applicable to data elements of a process model, i.e. not to data elements of composite data models:
  Type indicates the usage of the data by the process. Type may have one of the following values:
    Main indicates the main data of the process;
    Intermediate indicates intermediate data that the process uses; and
    Parent indicates a reference to the main data of the parent process; and
  Composition Method is the method by which an instance of the data model is distributed. It may have one of the following values:
    By Value—if a new instance should be created whose value is copied from the source; and
    By Reference—If only a reference to the source instance should be created.

Modeling constraints on Data Elements are as follows:
If a data element of a process model refers to a constant value data model, its Type must be 'Intermediate.'
A process model may have a single Data Element of type 'Main' and as many data elements of type 'Intermediate' as required.

A Slot functions as a gate to a process. Through Slots, processes can receive or send data.

There are four kinds of Slots:
An Asynchronous Input Slot is a slot from which a process can receive input after it has started;
A Trigger is a slot from which a process can receive input only before it starts. When a trigger is mandatory, the process cannot start before input actually arrives through the slot;
An Exit is a slot from which a process can send output at any time during its life-cycle. If the exit is 'terminating,' i.e., the Terminating attribute-value is 'true', the process terminates immediately after the exit is charged; and
Fail Exit is a slot from which an output is sent in case of an exception. A fail exit is a special kind of an exit, which means that the process terminates immediately after the output is sent through a fail exit.

Slots have the following attributes:
Role;
Model, describing the type of the data flowing through the slot (the value is a Model ID);
IsRepetitive, which is an indication whether the slot is repetitive or not. A repetitive slot can be the source or target of multiple flows, and thus can receive or send multiple inputs or outputs;
Mandatory, which is relevant for triggers only. as all other kinds of slots are optional by definition.

It indicates whether the input received at the slot is mandatory for the process. If a trigger is mandatory, the process will not start unless the input is received;
Choice Value, which is relevant for exits only. When modeling a switch-like process, this attribute defines for which value of the "choice expression" result the exit should be charged.
Addressing Clause, which is relevant only for asynchronous input slots of a repetitive process. It contains a query on the interesting fields of the process. At runtime, only instances which match the query receive the data from the slot. If this attribute is null, all instances receive the data; and
Terminating, which is relevant only for exits. It indicates if the process should terminate immediately after the exit is charged. When this attribute is 'false', the process proceeds with its task and will finish after completing all tasks or reaching a terminating exit.

Modeling constraints on Slots are as follows:
Terminating exits, and specifically slots of type Fail, may not be repetitive;
The 'Model' attribute of a slot can refer only to an independent data model. I.e., only instances of independent data models can travel through slots; and
The 'Model' attribute of a slot may not refer to a data model with a constant value.

A Flow defines the order of execution of processes, the transmission of data between processes and data trees, or both. Flows have the following pre-defined attributes:

Source, which identifies the slot or the data element from which the flow originates;

Target, which identifies the slot or the data element to which the flow is targeted;

Casting, which enables casting of the actual type of an object produced at the source to the type expected at the target; and Behavior, which defines the way that the flowing data is to be assigned at its target. Behavior may have one of the following values:

Replace is used if an instance already exists at the target. The new instance overrides it;

Update is used if an instance already exists at the target. The new instance updates existing values of data elements;

Enrich is used if an instance already exists at the target. The new instance enriches non-existing values of data elements, but does not change existing values; and Accumulate is used if the target is a repetitive object. The new instance results in the creation of a new instance of the repetitive target object.

The following is a description of all attributes, listed in alphabetical order:

Addressing Clause: Applicable to asynchronous input slots of a repetitive process. It is an SQL query used to select specific instances of the containing process model;

Behavior: Defines the way that data flowing through a flow is to be assigned in its target. Behavior may have one of the following values: Update, the default value; Replace; Accumulate; and Enrich. Behavior is applicable to each flow whose target is a data element;

Choice Value: An attribute of an exit. When modeling a switch process, Choice Value defines the value of the "choice expression" result for which the exit should be charged. It is applicable to exits;

Constant Value: Defines a fixed value for a data model in a specific context. It is applicable to data elements;

Dependent: Indicates a model that can only be used by exactly one model, its parent. It is applicable to process models and data models;

Distribution Method: Defines the way data is being distributed at runtime: By Value, if the data instance is copied and the target contains a copy of the original instance; By Reference, if the original data instance is distributed and no copy is created, thus any change in the target affects the original data instance. It is applicable to data elements;

Format Descriptor: Defines the way that data should be formatted using a pre-defined syntax similar to the syntax used by the C function "printf". It is applicable to data models;

ID: The unique identifier of a model. It is applicable to both dependent and independent models;

Independent: Indicates a model that can be used in more than one context, i.e. it can be referred by zero, one or more models. It is applicable to process models and data models;

Mandatory: Indicates whether an instance of the element must exist at runtime. If an element is mandatory, an instance of it should appear in runtime as many times as indicated by the attributes 'Min Occurrences' and 'Max Occurrences'. It is applicable to process elements, data elements and slots of type Trigger;

Max Length/Min Length: Define the maximum/minimum length in characters of a data value. It is applicable to data models;

Max Occurrences/Min Occurrences: Define the maximum/minimum number of times that a data element can be instantiated in a certain context. It is applicable to data elements;

Model: Refers to the Model ID of a model (e.g. when a slot refers to a data model defining the type of data flowing through the slot or when a process element refers to a sub process model). It is applicable to process elements, data elements and slots;

Plug-In Class Name: The name of the class that implements the functionality of a plug-in. It is applicable to atomic process models;

Role: The name that identifies an element in the context of the Model to which it belongs. Elements of the same parent should have different roles. I.e., the role is unique in the context of the parent model. It is applicable to slots, process elements and data elements;

Source: Identifies a slot or a data element in the context of a process model. It has a value of the path to the component at which the flow starts. A path is a string consisting of a series of roles separated by the character '/'. The path starts at the flow's parent model (the process model containing the flow) and includes all the roles leading in the model's hierarchy to the actual object from which the flow originates. It is applicable to flows;

Structure: Defines whether a model is atomic or composite. An atomic model is a model with no sub models. Atomic models must have a Plug-In Class Name. A composite model is a model containing one or more model elements. Each sub model can be atomic or composite. Structure has different legal value according to the specific model type: data model structure may be 'Selection', 'Concatenation', 'Collection' or 'Leaf', while process model structure can be 'Atomic' or 'Composite.' It is applicable to process models and data models;

Target: Identifies a slot or a data element in the context of a process model. It has a value of the path to the component which is the destination of the flow. A path is a string consisting of a series of roles separated by the character '/'. The path starts at the flow's parent model (the process model containing the flow) and includes all the roles leading in the model's hierarchy to the actual object that is the target of the flow. It is applicable to flows;

Terminating: An attribute of an exit that indicates whether the use (or "charge") of the exit terminates the process or not. The value of the attribute is either 'true' or 'false'. The term 'terminating exit' is used to describe a slot of type Exit for which the value of the Terminating attribute is 'true'. It is applicable to slots of type Exit; and Type: Defines a type for some of the modeling language entities, i.e., all models and elements. The value space of the Type attribute depends on the model or element to which it applies. It is applicable to process models, data models, data elements and slots.

The following section summarizes the semantics of the modeling language. As models are executed by the runtime engine, the semantics of the modeling language is tightly connected with the way the runtime engine works. On one hand, the runtime engine executes models exactly according to the semantic defined as part of the specification of the modeling language. On the other hand, the exact behavior of the runtime engine illustrates and helps understanding precisely the exact semantics of the modeling language. In some cases, the execution will be explained in terms of Trace Events, which are logical events that occur during the execution of a model by the runtime engine. They help describing in a well-defined way the behavior at runtime and enable a trace-based technique for debugging and tracing the actual execution of models.

The term 'processing step', when referring to the execution of a specific instance of a process model, describes a set of operations carried out sequentially without an interrupt. One processing step of an action (a "synchronous process") is defined as all the operations executed from its beginning, its Started event, to its end, its Finished event. This is a recursive definition: Action A can be composed of many other actions B1, B2, ..., Bn. Nevertheless, the duration of the execution of action A is one processing step, which comprises n processing steps as its sub-processes. Since an action cannot receive inputs after it starts, any action is always executed as a single processing step. The plug-in of an action, if there is one, must obey certain rules that make it synchronous as well.

An asynchronous process, on the other hand, which is a process that may receive inputs after starting, can start and finish in one or more processing steps. One processing step of an asynchronous process is defined as all the operations executed from the beginning of the process, its Started event, to its end, its Finished event, or until it returns control to its parent process, e.g. due to a Wait event. The Process resumes after it gets back control. The next processing step is from resuming the process until the process ends or until it returns control to its parent once again. There is no limit to the number of processing steps for an asynchronous process.

A System represents a process that has no life cycle, i.e., it is a daemon that has no beginning or end. Systems have no triggers. A sub-system can never be repetitive.

The set of processes that define a solution has a common, top level, system process that is typically called 'Topology.' Therefore the topology system is the ancestor of all other systems and processes in a given solution. Each modeled solution is associated with one topology. There is no special attribute for topology, whose identity is derived from the solution structure, i.e. from the fact that it is a top-level model activated directly by the runtime engine.

A non-system process which is a direct child of a system is called a Main Process. There is no special attribute for a main process. This characteristic is derived from the solution structure, i.e. from the fact that it is a direct child of a system.

The main data model of a main process model can contain 'interesting fields' information, which means that the modeler can point out some, or all, data fields of the main data of such a process to populate the columns of a table in the database associated with the instances of this process model. The effect of marking a set of fields as 'interesting fields' is the creation of a table in the database (one per a main process model), where each 'interesting field' defines a column in the table. During runtime, when an instance of the process model is stored, it creates a record in this table, and the content of the 'interesting fields' populates the corresponding fields in the database record. Whenever an updated version of the instance is made persistent, the corresponding database record gets updated accordingly.

Flows define the order of execution of sub-processes and/or the transmission of objects between sub-processes and between data trees. Flows create dependencies between the elements of a process model and these dependencies determine the actual order of execution in run-time. A flow always refers to two objects, the source object and the target object. An object flows from the source of a flow to its target. If it is an empty object, it means that the flow just defines Dependency between the source and the target, but no actual transmission of data. Dependency is achieved by the fact that the source must be ready before the flow occurs. Therefore the source will be ready before the target.

A flow is not associated with a single trace event. There are two events that describe a flow, Start and Finish. Between these two events, there are other events, related directly to the flow. All the events that occur between the Start event and the Finish event are part of the flow sequence. If more than one flow is ready to start, the runtime algorithm determines which flow will occur first.

When the target of a flow is a data model, the flow can assign a value to the target in four different ways, as defined by the value of the flow's Behavior attribute:

Update: If a value already exists in the target, then the value of the new instance updates the existing value. I.e. it changes the values of existing sub-objects and assigns new values if missing in the existing instance. Existing values are not deleted from the target even if they do not appear in the new instance. If a value does not exist in the target, the new instance is copied to the target;

Replace: If a value already exists in the target, it is replaced with the new instance. If a value does not exist in the target, the new instance is copied to the target;

Enrich: If a value already exists in the target, it is enriched by the new instance. I.e., the parts of the target data object that are missing in the existing instance are added, but existing information is not updated/replaced. If a value does not exist in the target, the new instance is copied to the target; and Accumulate: If the target is a repetitive object, the new instance results in creating another instance of the target object.

Notice that:

Update and Replace are identical for a leaf target object;

Accumulate is relevant for repetitive target objects only; and

Update, Replace and Enrich are not relevant for repetitive target objects, because if there are several instances of the repetitive object at runtime, a choice cannot be made as to which instance should be updated/replaced/enriched.

Normally the type of the model at the source and the type of the model at the target of a Flow are the same, and any differences will cause the model to be invalid. In some cases it is useful to allow such differences. E.g., when the source provides an object which is of a sub-type of the objects expected at the target, a flow declares that casting is allowed, no validation error occurs during modeling, and at runtime the runtime engine will try to cast the actual type to the target type. If the instance is actually an instance of the source model, then the casting will succeed. In any other case a runtime exception will be thrown.

Slots are used as gates to processes. Through Slots, a process can receive or send data. In most cases, each slot is associated with a data model, which indicates the type of data that can flow through the slot. However, there might be a slot with no data model. A Slot that has no data model associated with it serves only to indicate dependencies and timing of a process, as the sub-process containing the source of a flow must exit through that slot before the sub-process containing the flow's target may start.

There are four kinds of Slots:

A Trigger is a slot through which a Process receives data before it starts. If the trigger is mandatory, the process cannot start before the trigger is charged. A trigger can be repetitive. A mandatory repetitive trigger means that at least one object should be received before the process can start. An optional repetitive trigger means that zero or more objects can be received before the process starts;

A Process is ready as soon as all of its mandatory triggers are charged. Once the process starts, it cannot receive any data through any of its triggers;

An asynchronous input slot is a slot through which a process can receive data after it has started and before it finishes. No data can be received through an asynchronous input slot before the process starts. Only systems and asynchronous processes can have asynchronous input slots.

An asynchronous input slot can be repetitive. This means that zero or more objects can be received through this slot while the process is running.

An asynchronous process can reach a waiting state in which it has no more activities to do until an asynchronous input slot is charged. The process can resume as soon as an asynchronous input slot is charged.

Data can be sent through an asynchronous input slot of a repetitive process to a particular instance of the process model, some of its instances, or all of them. The way to determine the desired behavior is by using the 'addressing clause' attribute of the slot. This attribute contains a SQL query construct referring to the interesting fields of the process. If there is no addressing clause, all the instances will receive the data. In any other case, only the instances that match the query will receive the data;

An Exit is a slot through which a process can send data. If an exit is marked 'terminating,' the process terminates immediately when the exit is charged. At runtime, only one of the terminating exits can be charged for each instance of the process model. A non-terminating exit can be repetitive, sending out multiple data objects; and A Fail Exit is a special kind of an exit. Exiting through a fail exit indicates that a business exception has occurred during the lifecycle of the process.

Process models can contain data using data elements. Data elements of a process are used for two purposes: to hold the main data of the process; and to hold intermediate data that may be used during the lifecycle of the process itself. The main data element contains the core information of the process. A process can access its parent's main data directly, without the need to explicitly receive it through an input slot, using a data element that refers to the parent's main data.

Figure 14:
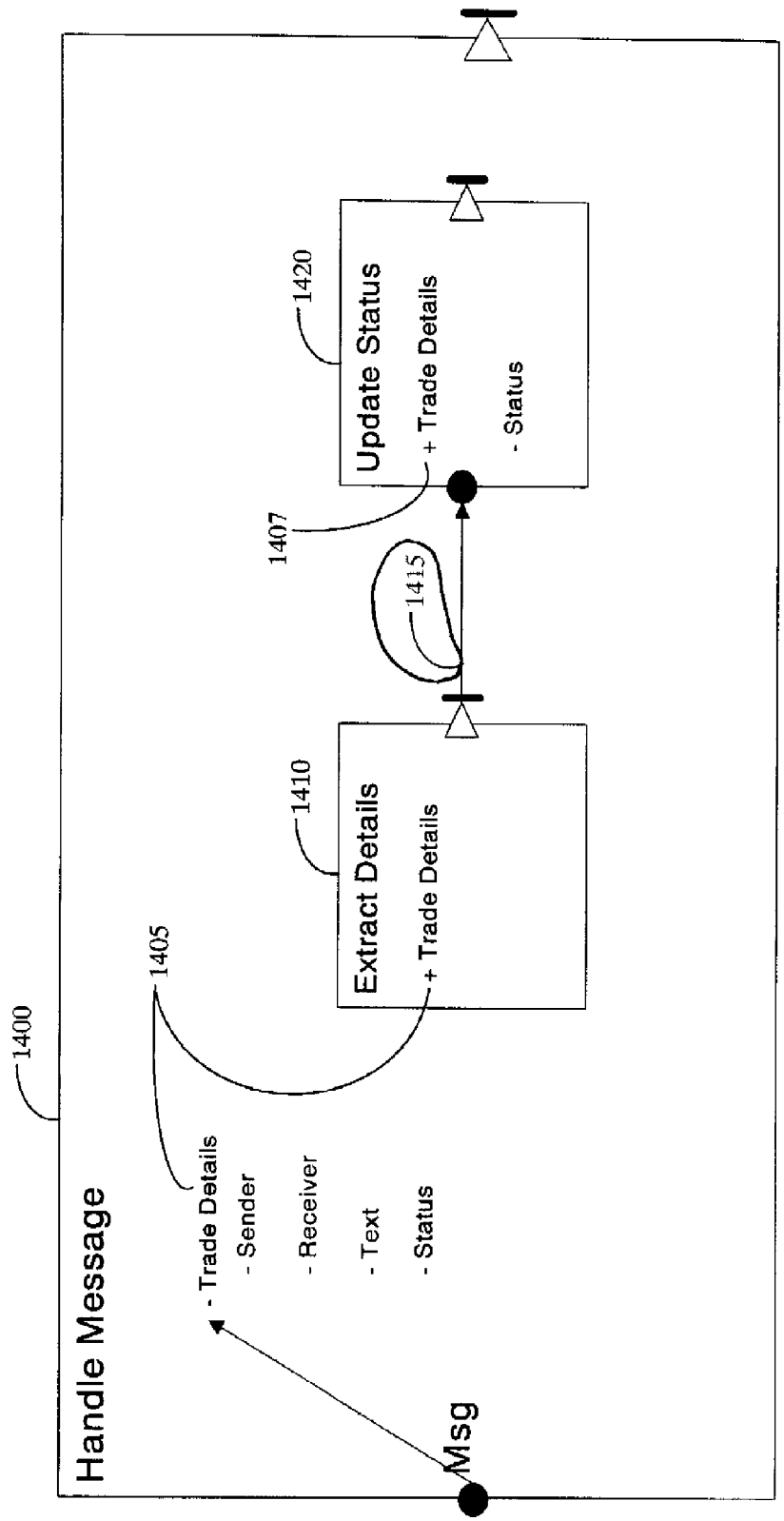
FIG. 14 is an exemplary schematic illustration of a process model with main data, constructed in accordance with the principles of the present invention.

FIG. 14 is an exemplary schematic illustration of the Handle Message process model 1400, wherein Trade Details is the main data element, constructed in accordance with the principles of the present invention. Inside Handle Message process model 1400, the type of the Trade Details element 1403 is 'Main'. Inside the Extract Details sub-process 1410, the type of the Trade Details element 1405 is 'Parent'. Inside the Update Status sub-process 1420, the type of Trade Details element 1407 is 'Parent' and the type of the Status element 1425 is 'Intermediate.' Intermediate data elements contain transient information that is used during the lifecycle of the process. Intermediate data is accessible only by the process itself, not by its children.

The behavior of some process models is coded through plug-ins. An atomic process must have a plug-in. There are two basic types of plug-ins: synchronous and asynchronous. Synchronous plug-ins define the behavior of synchronous processes, and they are relatively simple, as a single method implements the action's logic from start to end. Asynchronous plug-ins define the behavior of asynchronous processes. In an asynchronous plug-in, each processing step is implemented as a method, which must return control to the caller without delay. If the process needs to wait, it should signal the fact that it is waiting, but it may not call 'sleep' or other blocking operations like waiting on queues, listening to sockets, etc.

For example, a Timer plug-in, when started, simply writes a request for wake-up at a certain time and returns in a Waiting status. A special component, the scheduler, notifies the runtime engine at the right time, indirectly invoking the timer's Resume method, which changes the atomic action's status to Finished and returns control to the runtime engine or the parent process. When the plug-in gets a call to resume, it resumes and returns control to the calling process. A plug-in may resume more than once, based on the number of inputs that the asynchronous process receives, or the number of internal events to which the process listens to.

When a flow is invoked, the target element determines the way it receives the flowing data object. It can receive the object in one of the following ways:

By Value, wherein a new instance of the source object is created at the target and its value is copied from the source instance. The main disadvantage of this method is that many instances are created, which may require a lot of memory; and By Reference, wherein the target refers to the source instance. The main risk of this method is that an instance of one process can change an object in the scope of many other processes and affect all references to it.

The way a target receives an object is an attribute of the target element. For all applicable elements there are defaults:

A Slot Element receives objects by reference;

A Main Data Element of a process model receives objects by value;

An Intermediate Data Element receives objects by reference; and

Other Data Elements receive objects by value.

Objects are created on demand. As soon as an object is required, it is created, either as a new instance or as a reference to an existing instance.

Exception handling includes business exceptions and internal exceptions. A business exception can be handled by modeling. Each process may have a fail exit which catches business exceptions, allowing a modeler to model the process behavior in case of a business exception. If a process does not have a fail exit, and a business exception occurs, the exception floats up to the process' ancestors until a fail exit is found. If none of the ancestors has a fail exit, the runtime engine treats the business exception as an internal exception. An internal exception is an exception which is not handled by modeling. The Runtime Engine has a default behavior for an internal exception.

Data is information used by a process during its lifecycle. Data is represented by trees. Data instances contain both semantic and syntactic information. Semantic information, e.g. the type of data that is stored in a data Instance, is always required. Syntactic information is required for the purpose of "parsing" and "serializing" data objects, and hence needs to be specified only if data is used as input to a parsing or a serialization process.

A buffer is parsed based on its syntactic attributes, e.g. Format Descriptor, Separator, Character Group, and field length attributes. The result of the parsing process is a data tree that contains data instances for each field that exits in the buffer. The parsing process is implemented by a plug-in.

A data tree is serialized based on its syntactic attributes. The result of the serialization process is a buffer that contains the concatenated data from all data fields within the source data tree. This data is formatted based on the data's syntactic attributes, e.g. leading and trailing padding and separators are added as required. The serialization process is also implemented as a plug-in.

A Constant is a data object with a fixed, pre-defined, value. Constants have at least two usages:

The constant is a process data element, such that the constant is used as an intermediate data object with a pre-defined value. This is a value that is determined and set at modeling time, rather than at runtime. In most cases this data will be used as the source for assignments; and The constant is a data element of a composite data object. Constants are needed to define formats, such as tags in some types of structured messages. The constant value is used by the parsing plug-in when parsing an incoming message, comparing the actual content to an expected value, and by the serialization plug-in when serializing an instance of data, adding the constant's value to the serialized content at the proper places.

There are some data models that have a compulsory predetermined construction, wherein a certain type of data model contains some known data elements with known roles. The modeling language has two such data types. Both are used to hold syntactic information about the format of the data as follows:

Data model of type 'Character Group' is a leaf data model whose constant value is a string of characters, defining the set of characters that may appear in instances of data models applying this character group. A data model may have an attribute 'Character Group' which refers to the appropriate character group model;

Data model of type 'Structure' is a collection of the following data elements:

A Data element with the role 'Empty Field Policy.' This refers to a leaf data model whose constant value is one of the following strings: 'Must Appear;' 'Must Not Appear;' and 'Appear as Place Holder;'

A Data element with the role 'Left Padding.' This refers to a leaf data model whose constant value is a single character that is used as left padding;

A Data element with the role 'Right Padding.' This refers to a leaf data model whose constant value is a single character that is used as right padding; and A Data element with the role 'Separator.' This refers to a composite data model that holds information regarding separators between data elements, containing the following elements:

A Data element with the role 'Separator String.' This refers to a leaf data model whose constant value is the separator;

A Data element with the role 'Separator Right Context.' This refers to a leaf data model whose constant value contains a string that should appear after the separator, or, if 'Is Right Context Negative', should not appear after the separator;

A Data element with the role 'Is Right Context Negative'. This refers to leaf data model whose constant value is one of the following: 'true;' and 'false;'

A Data element with the role 'Separator Left Context'. This refers to a leaf data model whose constant value that contains a string that should appear before the separator, or, if 'Is Left Context Negative', should not appear before the separator; and A Data element with the role 'Is Left Negative.' This refers to a leaf data model whose constant value is one of the following: 'true;' and 'false.'

Modeling Environment

The following section describes the modeling environment for defining and implementing software solutions defined in the modeling language, the second major element of the present invention.

The modeling environment comprises three main components:

a Graphical User Interface (GUI) tool, or "Modeling Tool," which enables a user to visually create models, which are modeling language definitions of the components of the developed solutions;

a "Knowledge Base" consisting of a repository of models saved in a formal representation. In accordance with the preferred embodiment of the present invention, XML based representations of models are used, but other formal representations such as binary files or database records are possible as well; and a runtime engine that interprets modeling language models and executes the solution they define. The runtime engine is the main component of the runtime environment, enabling the execution of modeling language models. When used as part of the modeling environment, the runtime engine allows users of the modeling tool to test their models as part of the solution development process. Alternatively, a code-generator may be used to generate machine or source code from the models.

The workspace of the modeling tool is an "infinite drawing board" for displaying hierarchies of two dimensional diagrams, which are graphical representations of corresponding hierarchies of modeling language models. In addition, the modeling tool includes several menus, palettes and toolbars that support the operations the user can perform. Users of the modeling tool can display existing models or any component thereof, create new models, modify existing models or test models.

The modeling tool represents the entities comprising the modeling language as follows: process models are displayed as process diagrams, which are various two dimensional shapes, e.g. rectangles, diamonds, triangles, circles, etc. Sub process models are similarly displayed as process diagrams, each contained within the process diagram of its parent process model. Slots are displayed as slot diagrams, which are various two-dimensional shapes, e.g. circles, triangles etc., situated on the edges of the process diagrams. Data models are represented by data tress, which are hierarchical tree structures. Data elements that are parts of process models are represented as data trees within process diagrams. Flow rules are represented as flow arrows, which are arrows connecting source slots or data elements to target slots or data elements.

The "infinite drawing board" notion implemented by the modeling tool allows a user to zoom in and out from a currently displayed part of the hierarchy of diagrams to any desired diagram, thereby displaying the details of any model or any sub-model thereof at any required level. By focusing on a certain diagram, the corresponding underlying model component becomes available for editing.

Users of the modeling tool create and edit modeling language models using various GUI operations such as creating new process or data models through menu operations, adding components to process or data models by dragging models from palettes of existing models, modifying attributes of models and of model components, etc. The modeling tool prevents the user from creating models that are inconsistent with the restrictions of the modeling language.

Real Life Example

Figure 15:
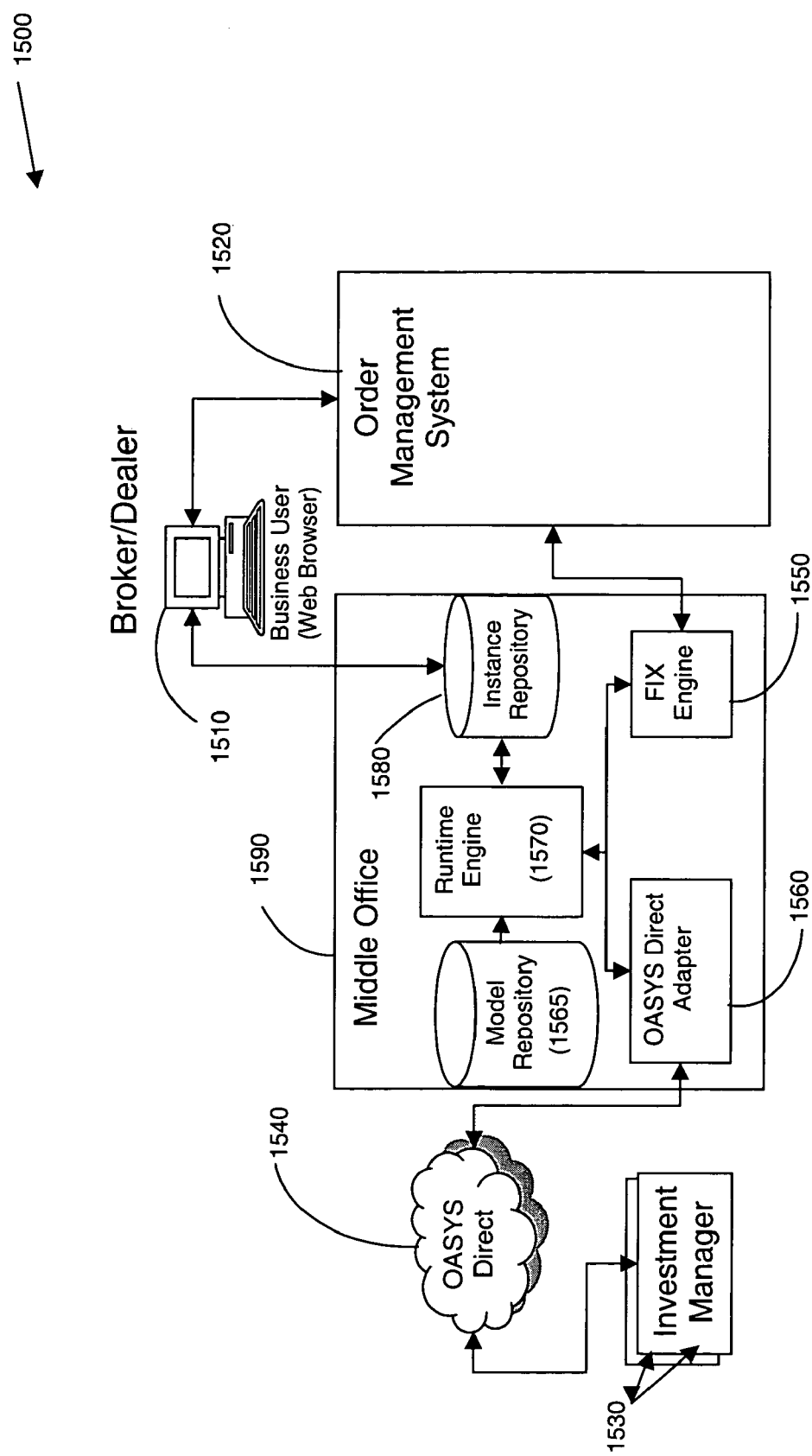
FIG. 15 is a schematic illustration of a test case, demonstrating a typical real life software problem, whose solution is to be modeled in accordance with the principles of the present invention.

FIG. 15 is a schematic illustration of a test case, demonstrating a typical software problem, whose solution 1500 is to be modeled in accordance with the principles of the present invention. Such a system is required by many U.S. Broker/Dealers.

The software development task is to connect the Order Management System 1520 of a U.S. Broker/Dealer 1510 to multiple Investment Managers 1530. Order Management System 1520 knows to send and receive messages related to securities trading according to the FIX protocol, while the Investment Managers 1530 expect to interact with the Broker/Dealer according to the OASYS Direct protocol and through the OASYS Direct network 1540. OASYS Direct is a service that enables U.S. Investment Managers and Broker/Dealers to exchange messages regarding institutional securities trading.

Software solution 1500 implements a Broker/Dealer Middle Office 1590, which should connect to Broker/Dealer's Order Management System 1520 on one side and to OASYS Direct network 1540 on the other side, and should manage the lifecycle of trades, including the receiving of financial messages from each side, tracking the status of each trade, generating output messages to be sent to the other side, etc.

The technical interaction with Order Management System 1520 and OASYS Direct network 1540 is achieved through a standard FIX Engine 1550 and an OASYS Direct Adapter 1560 respectively, both common in the industry. According to the present invention, there is no need to write source code in any programming language in order to implement the Middle Office system 1590. Instead, a modeler can model the specific business logic of the Middle Office solution using the modeling tool of the current invention, with reference to FIG. 16 below, and the models are stored in the Knowledge Base, or model repository, 1565.

Once modeled, the solution is executed by a runtime engine 1570, constructed in accordance with the principles of the present invention. As runtime engine 1570 runs, it processes inputs received from FIX Engine 1550 and OASYS Direct Adapter 1560, manages multiple securities trades and send output messages to OASYS Direct Adapter 1560 and FIX Engine 1550. All "interesting fields" of all trades are made persistent after any modification to an instance repository 1580, which is implemented as a set of relational database tables.

Figure 17:
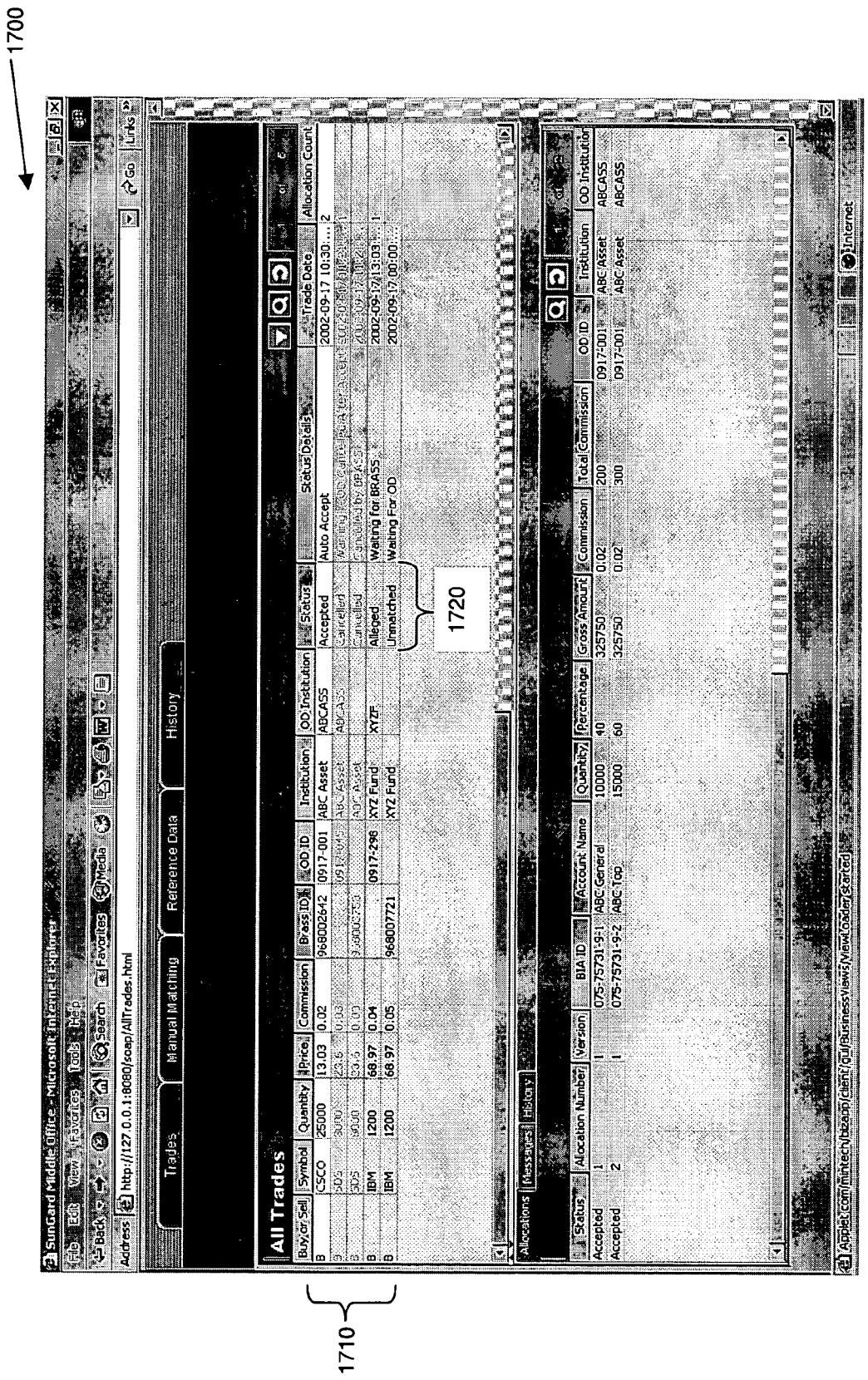
FIG. 17 is a screen-shot illustration of a typical browser-based application, showing an application that enables users to view the "interesting fields" of instances saved in an instance repository, constructed in accordance with the principles of the present invention.

Users 1510 of the Order Management System 1520, as well as other users, can view the details of each trade in the instance repository 1580 through a standard browser-based application, a screen-shot of which is illustrated in FIG. 17. While the solution is running, these business users are able to view the details of any trade, see how trades change, retrieve trades, and perform any other operation as is common for records stored in a relational database.

Figure 16:
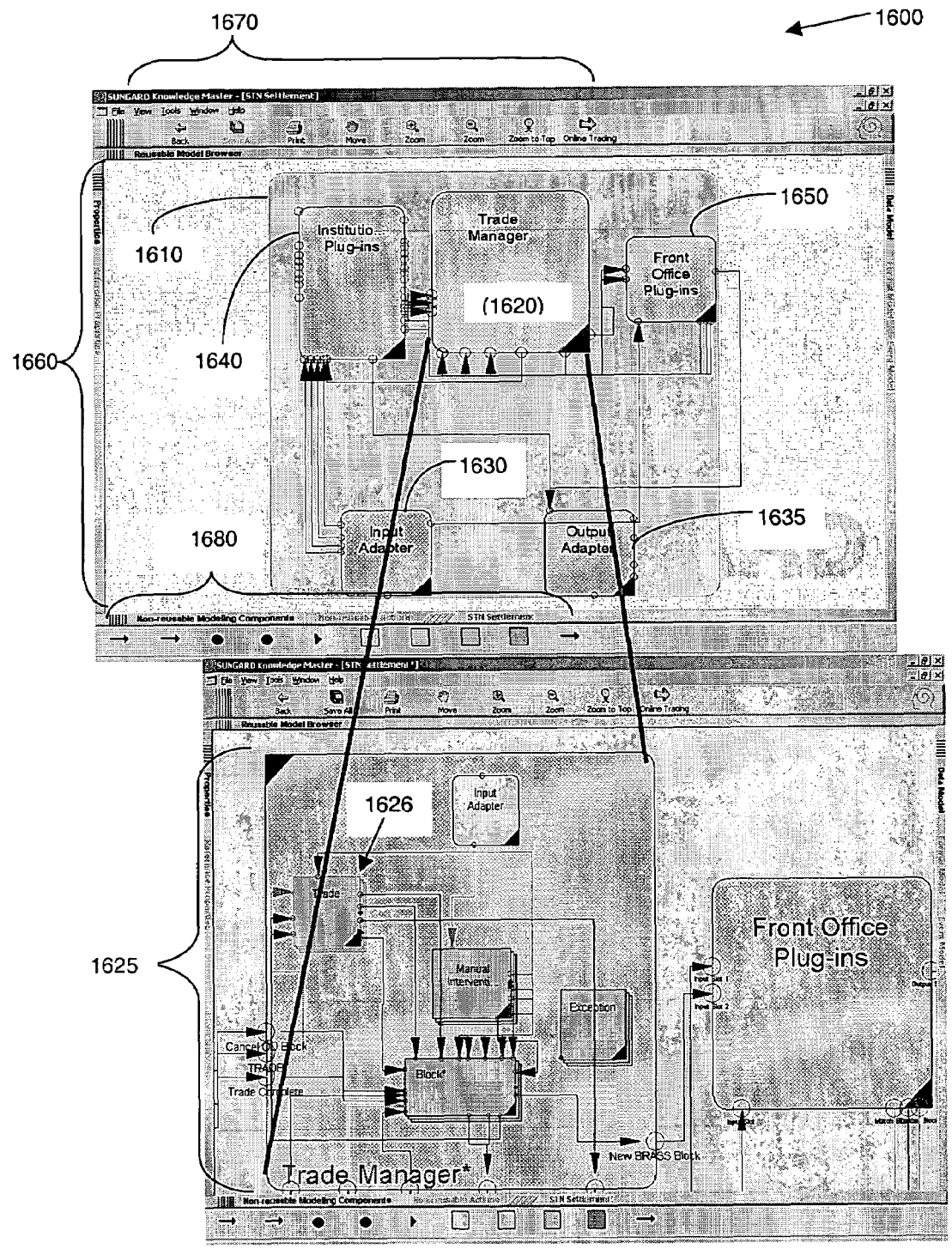
FIG. 16 is a screen-shot illustration of visual modeling tool, showing the zoom-in transition from a top-level model to an expanded display of one of its sub-models, constructed in accordance with the principles of the present invention.

FIG. 16 is a screen-shot illustration of a visual modeling tool 1600, constructed in accordance with the principles of the present invention. FIG. 16 shows the zoom-in transition from a top-level system model 1610 containing a 'Trade Manager' sub-system model 1620 to an expanded display 1625 of the 'Trade Manager' system model. Employing this intuitive graphical interface for further zooming into sub models of sub models allows the modeler an "infinite zooming capability" into any detail of any model.

Top-level system model 1610 defines the logic of Middle Office solution 1590 of FIG. 15. It consists of five sub-system models:

- 'Input Adapter' 1630, modeling the receiving of messages from external systems;
- 'Institutional Plug-ins' 1640, containing a set of sub-models, each modeling the handling of messages received from a specific institutional securities trading system, e.g. OASYS Direct, and the generation of output messages that should be sent to this system;
- 'Trade Manager' 1620, modeling the core business logic of the Middle Office solution, including the creation of new trades, changing the status of trades based on various events, etc.;
- 'Front Office Plug-ins' 1650, containing a set of sub-models, each modeling the handling of messages received from a specific front-office system, e.g. Order Management System, and the generation of output messages that should be sent to this system; and
- 'Output Adapter' (1635), modeling the sending of messages to external systems.

Modeling tool screen-shot 1600 displays the hierarchy of models, starting at top-level system model 1610, in workspace 1660, which exposes part of the modeling tool's "infinite drawing board." Around this major component of the modeling tool there are: a menu 1670 of commonly used operations; a palette 1680 of template models, slots and flow rules; a property sheet with the properties of the currently displayed modeled (not displayed); and a palette of existing models in the model repository (not displayed).

The modeler may open any sub-model of the currently displayed model, e.g. 'Trade Manager' system model 1620, and zoom-in to its details. Zoom-in display 1625 of 'Trade Manager' system model 1620 shows sub-models of 'Trade Manager' 1620, e.g. repetitive process model 'Trade' 1626, whose instances are the trades flowing through the solution. The user can further zoom-in to sub-sub-models of the currently displayed model to any desired level in the hierarchy of models.

Figure 16A:
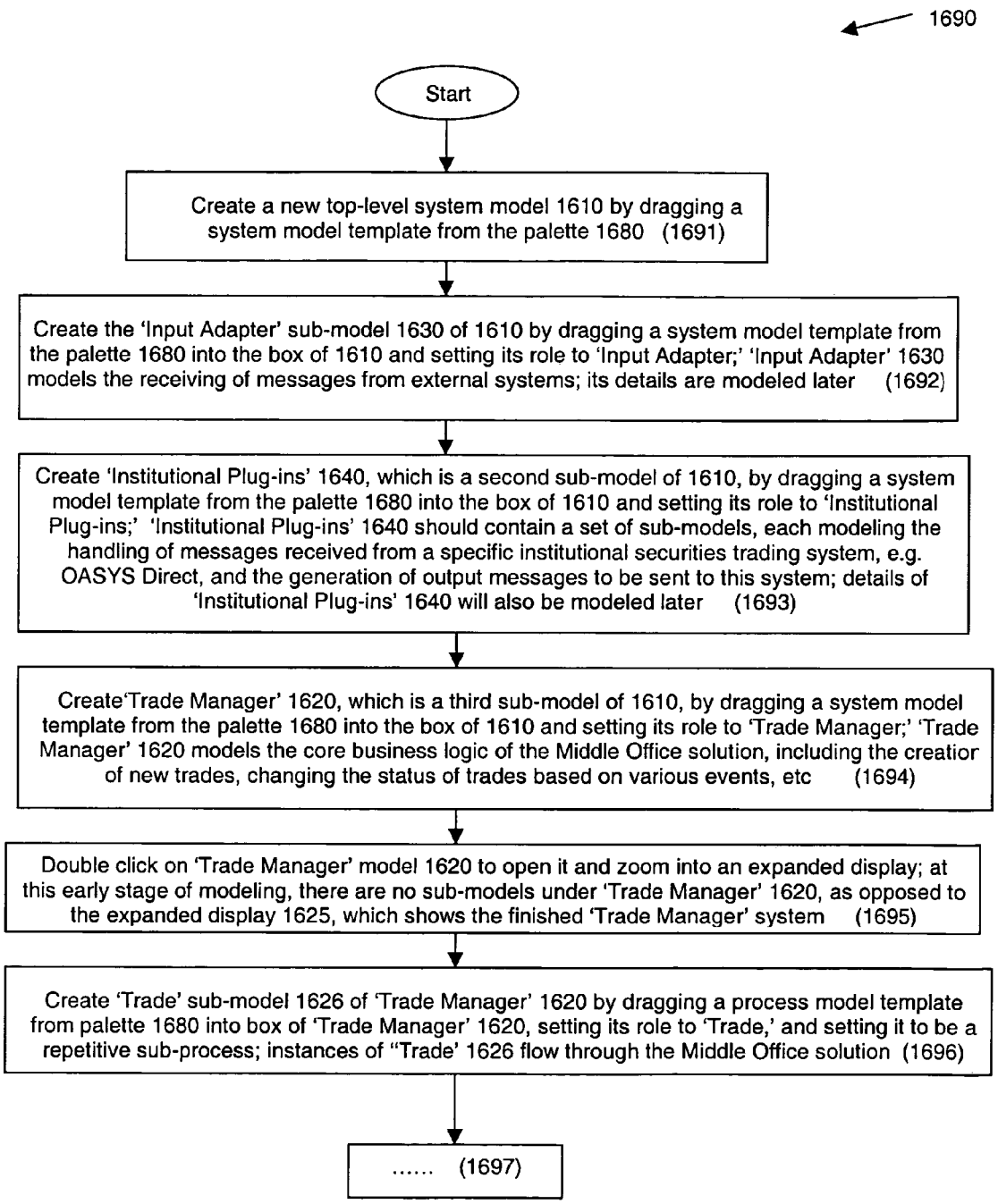
FIG. 16a is a flow chart that partially describes the modeling of the Middle Office system of FIG. 15, which can be carried out with the described series of modeling operations.

Referring now to FIG. 16a (and therein to FIGS. 15 and 16), modeling the Middle Office system 1590 can be carried out by the following series of modeling operations 1690:

1. Create a new top-level system model 1610 by dragging a system model template from the palette 1680 (1691).
2. Create the 'Input Adapter' sub-model 1630 of 1610 by dragging a system model template from the palette 1680 into the box of 1610 and setting its role to 'Input Adapter.' 'Input Adapter' 1630 models the receiving of messages from external systems. Its details are modeled later (1692).
3. Create 'Institutional Plug-ins' 1640, which is a second sub-model of 1610, by dragging a system model template from the palette 1680 into the box of 1610 and setting its role to 'Institutional Plug-ins.' 'Institutional Plug-ins' 1640 should contain a set of sub-models, each modeling the handling of messages received from a specific institutional securities trading system, e.g. OASYS Direct, and the generation of output messages to be sent to this system. The details of 'Institutional Plug-ins' 1640 will also be modeled later (1693).
4. Create 'Trade Manager' 1620, which is a third sub-model of 1610, by dragging a system model template from the palette 1680 into the box of 1610 and setting its role to 'Trade Manager.' 'Trade Manager' 1620 models the core business logic of the Middle Office solution, including the creation of new trades, changing the status of trades based on various events, etc (1694).
5. Double click on 'Trade Manager' model 1620 to open it and zoom into an expanded display of it. At this early stage of modeling, there are no sub-models under 'Trade Manager' 1620, as opposed to the expanded display 1625, which shows the 'Trade Manager' system when its modeling is finished (1695).

6. Create the 'Trade' sub-model 1626 of 'Trade Manager' 1620 by dragging a process model template from the palette 1680 into the box of 'Trade Manager' 1620, setting its role to 'Trade', and setting it to be a repetitive sub-process. The instances of 'Trade' 1626 are the trades flowing through the Middle Office solution (1696).

7. (1697) . . .

To complete the typical example presented in FIGS. 15, 16 and 16*a*, FIG. 17 is a screen-shot illustration of a typical browser-based application, showing a trade monitoring application 1700 that enables users to view the "interesting fields" of trade instances saved in an instance repository, constructed in accordance with the principles of the present invention. While the solution is running, business users are able to view the details of any trade, see how trades change, retrieve trades, and perform any other operation as is common for records stored in a relational database.

For example, the following is a partial list of user capabilities, provided the relevant information has been modeled to be saved in the instance repository:

- view all trades 1710 or query for specific trades by various criteria;
- see the list of trades automatically updated when a new trade is created;
- monitor a trade as it progresses in its life cycle and its status field 1720 changes accordingly;
- get a list of all incoming and outgoing messages related to any trade; and
- view the full history of any trade and errors associated with it.

Knowledge Base

Returning to the modeling environment, the Knowledge Base is a repository of formal representations of models that are provided by third parties or developed by the users of the modeling tool. The formal representation of a model should contain all the details of the model, to enable the modeling tool to retrieve the model for further usage and to enable the runtime engine to execute it. It is possible to arrange the models in a hierarchy of packages, where each package or sub-package contains models that belong to a specific domain, a specific solution, or a specific provider.

In accordance with the preferred embodiment of the present invention, each independent model is represented as an XML document whose schema depends on the type of model, in order to fit its structure and attributes. E.g. the structure of an XML document representing a process model differs from that of an XML document representing a data model. The collection of XML documents stored in the repository is saved as a set of files in a hierarchy of folders. Each folder represents a package, thus enabling configuration management of modeled solutions using standard configuration management tools. It is also possible to use other formal representations of models, e.g. representing model components as binary files or as records in a database.

In the context of the modeling environment, the runtime engine is used for testing solutions, i.e. to execute models in order to verify that they properly define the required solution. The runtime engine can be invoked by the modeling tool to execute a specific model, while external input is simulated by human input, by special-purpose simulators, or by retrieving previously saved data objects.

Through the usage of records listing the trace events that have occurred during the execution of a solution, as generated by the runtime engine, the modeling tool can be used as a "visual debugger" to trace the execution of models by the runtime engine. To this end, the modeling tool can be-switched from the regular modeling mode to a special trace mode, in which instances of the traced model are presented by hierarchical diagrams in an identical manner to the presentation of the model itself, but with additional information reflecting the current status of each instance. Color coding is used to distinguish between steps that have already been performed, steps that are currently active, etc.; textual data is used to present the content of data elements; and other graphical means are used to give the user full information on the full status of each instance. The user can trace the execution step by step, set breakpoints and conditional breakpoints, etc. The user can also trace the details of execution of models after the execution has completed by viewing and searching a detailed trace log that records all the trace events during the execution, thus tracking the processing steps that have led to any desired status along the execution.

Runtime Engine

The following section describes the design of an exemplary embodiment of the runtime engine, the third major element of the present invention. The term Runtime Engine describes the routine, or the software program, that governs the execution of any process during runtime, somewhat like the way an operating system runs different applications. The runtime engine is responsible for actually carrying out what the models define exactly as defined.

The architecture of the runtime engine comprises two main components:

- an interpreter that is responsible for processing data according to the logic defined in the models; and
- a scheduler that is responsible for activating the interpreter at the correct time, according to the same modeled logic.

Figure 18:
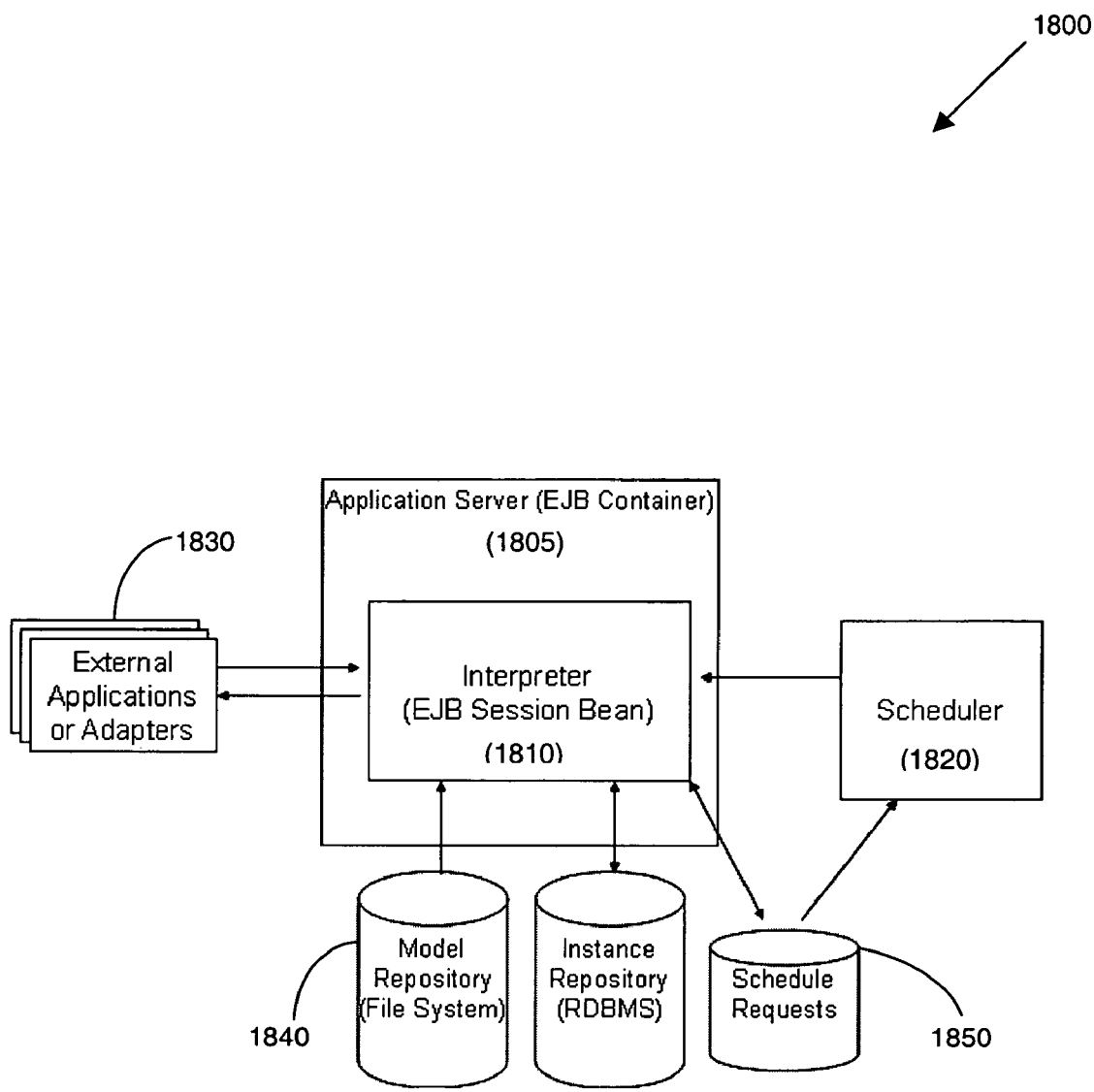
FIG. 18 is a schematic block diagram of the architecture of a preferred embodiment of the run-time engine in an Enterprise Java Beans (EJB) configuration, constructed in accordance with the principles of the present invention.

FIG. 18 is a schematic block diagram of the architecture of a preferred embodiment 1800 of the run-time engine in an Enterprise Java Beans (EJB) configuration, constructed in accordance with the principles of the present invention.

Both the interpreter 1810 and the scheduler 1820 are written in Java, and are composed of various classes. Interpreter 1810 and scheduler 1820 can run within different threads in the same process in a single Java Virtual Machine (JVM), or as separate processes, each with its own JVM. In accordance with this alternative embodiment, interpreter 1810 runs as a Remote Method Invocation (RMI) server or as an Enterprise Java Beans (EJB) session within an application server 1805. Scheduler 1820 runs as a separate process.

Interpreter 1810 is the component responsible for the actual logic of the system. It receives input from the environment, e.g. external systems 1830, and enacts any processing defined in the models as read from the model repository 1840. Interpreter 1810 updates the state of processes in a run-time database and performs external actions, such as sending messages via the models' plug-ins.

Scheduler 1820 is an auxiliary component that monitors a schedule table 1850 and activates interpreter 1810 when the time comes to perform a certain action. Note that scheduler 1820 is not always needed, e.g. in some solutions wherein all processing is triggered by external input, and there is no need to act on time-based events.

Figure 19:
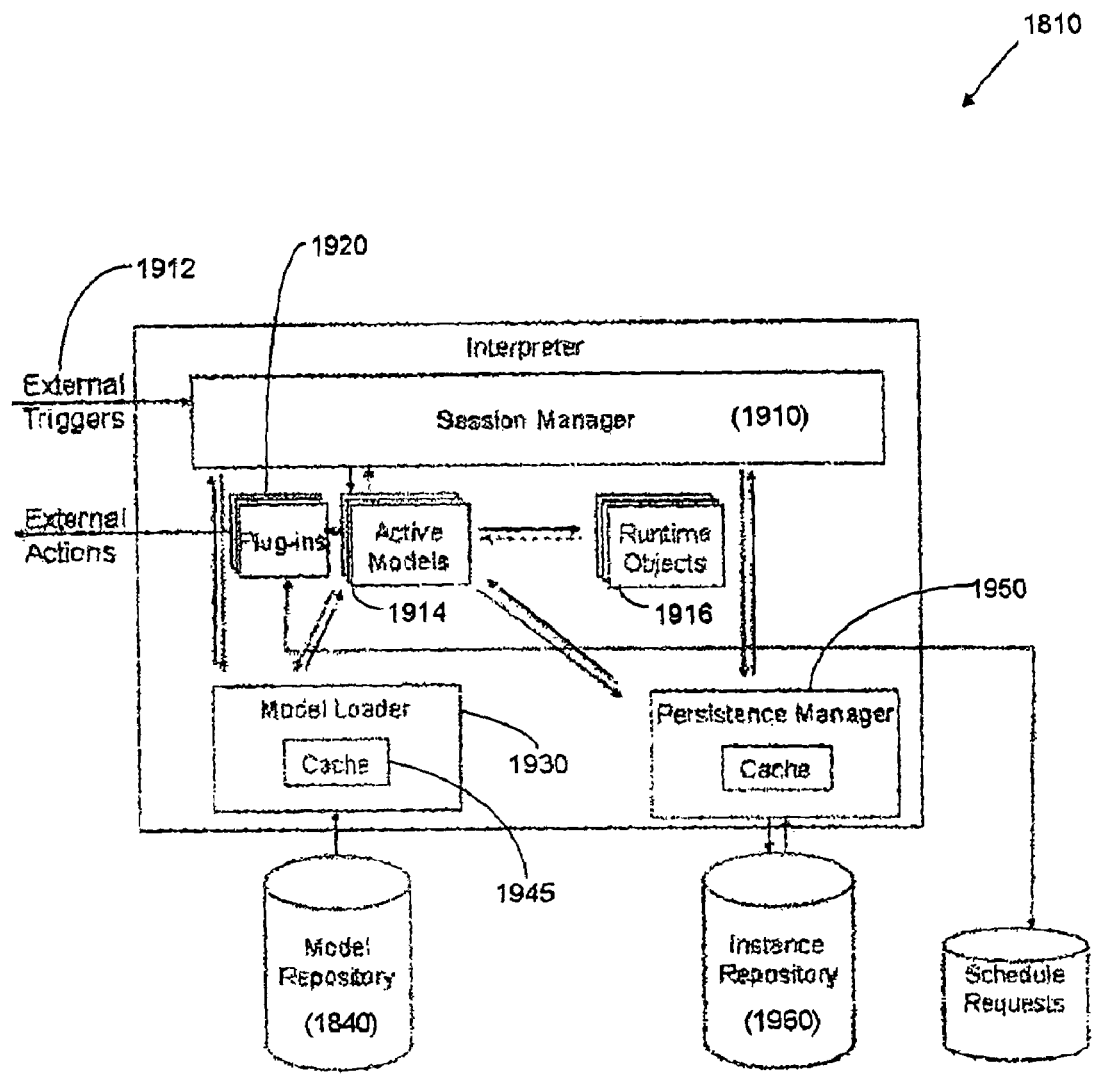
FIG. 19 is a schematic block diagram of the interpreter, constructed in accordance with the principles of the present invention.

FIG. 19 is a schematic block diagram of the interpreter 1810, constructed in accordance with the principles of the present invention. Interpreter 1810 comprises the following components, i.e., in the preferred embodiment, Java classes:

A Session Manager 1910, the 'front-end' of the interpreter, having the following functions:

Receiving input 1912 from external sources or from the scheduler;

Managing database connections, either through an internal pool or using the EJB container's connection pool;

Retrieving the relevant 'Active Models' 1914 and 'Runtime Objects' 1916;

Initiating logic processing by Active Models 1914;

Catching and reporting exceptions; and

Closing database transactions, commit on success, rollback on exception.

Each Active Model 1914 represents and enacts the logic embodied in a single model in the model repository 1840. Active models 1914 manage the rules embodied in the models, such as flow rules, sub-process invocations etc., as well as the logic to interpret these rules. Active Models 1914 form a composition hierarchy isomorphic to the composition hierarchy represented by the model.

The term Active Model is used to express the fact that these representations of models are used to support model execution rather than visual manipulation. Active models 1914 contain only executable information, excluding visual information such as layout and graphics that are used by the modeling tool. The executable information is held in data structures that optimize the run-time behavior. E.g. flows are attached to their respective sources, as opposed to their symmetric logical and visual representation in the modeling tool.

Plug-ins 1920 are Java classes that implement low level logic like addition, multiplication and table lookup, as well as any other non-standard logic that is required in the solution. It is also possible to use plug-ins to wrap existing code that implements business specific functionality and reuse it within an otherwise fully modeled solution. Each active model 1914 that represents an atomic process holds a reference to an instance of the relevant plug-in class. Each plug-in instance is initialized using data from the containing process.

The Model Loader 1930 reads model from the model repository 1840, converts each model to a corresponding active model 1914, and maintains a first memory cache 1945 of active models that are in-use. The Model Loader 1930 encapsulates all the logic related to finding the models in repository 1840 and handling their formal representation as stored in the repository.

Runtime Objects 1916 represent instances of process and of data models, where there may be at any time any number of runtime objects instantiated from each model by the corresponding active model:

The Runtime Object class is basically an ordered multimap, where each object contains components identified by the component's role, and where the components have a well defined order;

Retrieval by role, and hence by path of roles, is optimized using a hash mechanism;

Each run-time object 1916 has: an ID; a reference to its model, signifying the type of the object; a reference to its 'parent' object, signifying the context of the object's creation; and a 'value' that can hold any Java object;

For leaf data objects, the value holds an instance of the data model's plug-in class, typically a String, a Boolean or a Number;

For composite data objects, the value is empty, i.e. null; and

For processes, the value holds the status of the process: Created; Active; Waiting; Finished; or Terminated.

The Persistence Manager 1950 manages the persistence aspects of run-time objects, handling database storage and retrieval and in-memory caching;

Runtime Objects 1916 are stored in 2 formats: entire composite objects are serialized and stored in a binary format, allowing efficient retrieval of composite structures by the persistence manager, while 'interesting fields' are stored in parallel in a tabular format for efficient querying and for convenient read-only access by external tools, such as report generators;

Although the entire 'universe' of instances can be considered a single logical 'tree' or hierarchy, where all runtime objects 1916 are descendents of the topology, this universe is broken down into smaller pieces for database storage, where each 'main process' is stored with all of its descendents in a database record of its own;

This approach is backed by the following identification scheme: each instance in the instance repository 1960 is identified by an ordered pair of integers where the first identifies the main object and the second provides an identification of a node within the main objects. The 'node ID' of the main object itself is always zero. ID's for additional nodes are generated sequentially on demand and are used for references across the hierarchy. Most nodes never have an ID assigned;

The main processes are stored in a generic table, each as a single record that contains a binary serialization of its sub-hierarchy, and the ID of the main object;

In addition, if interesting fields are defined for the process, these fields are stored in a specific table, connected to the generic table; and Persistence manager 1950 'synchronizes' the database 'on demand,' inserting and updating records to represent the latest content of a second memory cache 1955. This happens either at the end of a session, after successfully processing an external input 1912, or before query operations, either queries by plug-ins 1920 or implicit queries resulting from addressing operations.

Figure 20:
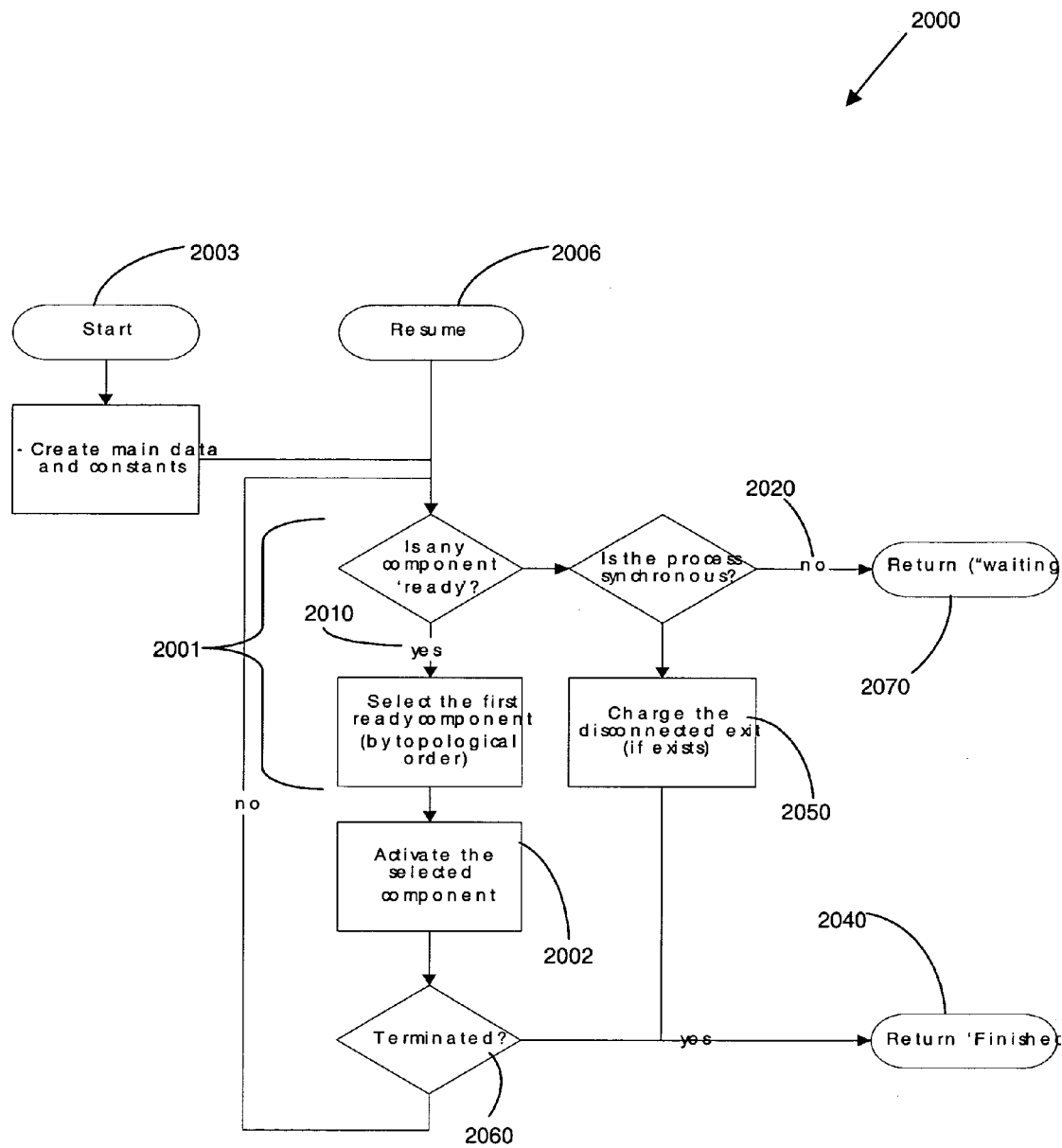
FIG. 20 is a flowchart of the process execution algorithm, constructed in accordance with the principles of the present invention.

FIG. 20 is a flowchart of the process execution algorithm 2000, constructed in accordance with the principles of the present invention. This algorithm is the core logic of the interpreter. The key concepts of this algorithm are 'readiness' 2001, 'activation' 2002 and 'flow execution.'

A component of a process is called 'ready' 2010 when one of the following is true:

It is a sub-process that has not yet started and all of its mandatory inputs have been received;

It is an asynchronous sub-process that had been waiting and then received an asynchronous input or an internal input;

It is a data element of the process (main, constant, or intermediate) and has been created but not yet activated; and It is an input of the process, either a trigger or an asynchronous input, and it is 'charged.'

Components are activated according to the following logic:

Sub-processes are started-2003 or resumed 2006. When a sub-process returns control, either by finishing 2040 or waiting for additional input 2070, all outgoing flows are executed. If the sub-process throws an exception, the exception is either thrown further up, or, if there is a corresponding fail exit, translated into an error report object used to charge the fail exit before returning control to the parent process;

For data elements, outgoing flows are executed, and the element is marked 'done,' i.e., it is no longer ready; and For input slots, either triggers or asynchronous input slots, outgoing flows are executed, and the slot is discharged, i.e., it becomes empty and is no longer ready.

Flow execution means the following:

For each flow, all instances of the source component are selected;

Each instance is 'sent' to the target, meaning:

For data elements, modifying the data element according to the flow behavior, i.e. updating, enriching, replacing or accumulating;

For input slots of sub-processes, charging the slot, i.e. making the sub-process ready;

For input slots of repetitive sub-processes, either triggers or asynchronous input slots, the behavior is more complex, see below; and For exits, charging the exit 2050. If a terminating exit is charged 2060, the process finishes 2040.

Flow into a trigger of a repetitive sub-process is performed as follows:

If there are no instances of the sub-process yet, a special object called the 'input set' is created. This object holds references to the inputs that are common to all instances of the sub-process;

If the target trigger is mandatory, called "the generating trigger", a new instance is created, and its corresponding trigger is charged, and all the input objects in the input set are used to charge the slots of the newly created instance; Otherwise, the input object is added to the 'input set,' as well as to any instances of the sub-process that have not yet started. As a result, the instances may become ready.

Flow into an asynchronous input of a repetitive sub-process is performed as follows:

The relevant instances are selected. This refers to all instances that have not yet finished and that meet the conditions of the addressing clause. If there is no addressing clause, all 'waiting' instances are selected;

If the slot is marked as 'unique target must be found', and if the number of instances selected is different from 1, an error is thrown; and For each instance, the input slot is charged, making the instance 'ready.'

The Life Cycle of a process comprises the following states:
1. Created: The first stage in a process' life cycle is its creation. A process is created as a result of the following events:
   If the process has no triggers, it is created as soon as the parent process starts; and
   If a flow, which contains one of the process' triggers as target, should occur, and the process has not been created yet, it is created. The flow occurs after the creation of the process;
2. Ready: A Process is ready when data is received through all of its mandatory triggers;
3. Started: A Process starts after it is ready. It is started according to the logic defined in the model of its parent process;
4. Waiting: An asynchronous process can return control to its parent, or the runtime engine, and get into a waiting mode until it is resumed after an asynchronous input is received or after an internal event occurs. A process gets into a waiting status in one of the following scenarios:
   The process plug-in waits for an internal event, e.g., the Timer plug-in waits for the scheduler to wake it up; and
   There are no more flows or sub-processes to activate, but the process has not terminated;
5. Internal: An asynchronous process that is currently in a waiting mode can receive an internal event from the engine. As a result, the asynchronous process stops waiting and resumes its processing;
6. Resumed: An asynchronous process may resume processing as a result of the following events:
   The process has received an internal event and the engine decides that the current process is the next one to activate;
   One or more asynchronous inputs have been received and the engine decides that the current process is the next one to work; and
   Some or all of the inputs have not been received, but there is no chance to receive them in the same processing step, because the processes that should have populate them have already finished with no relevant outputs, and there is at least one child process that is 'Ready' to start;
7. Finished: A process finishes in one of the following scenarios:
   One of the terminating exits is 'Charged;'
   Its fail exit is 'Charged;'
   Its parent process has finished;
   The process is a composite action that has no sub-process in the 'Ready' state, i.e., all its sub-processes are not ready or have finished; and
   The process is an atomic action and its plug-in code has terminated.

As an alternative to a runtime engine, a code-generator may be used to generate machine or source code from the models.

When this alternative is selected, there is no need to implement a runtime engine. Instead of implementing a runtime engine that is capable of executing the logic embodied in models, and activate the runtime engine each time on a different hierarchy of models, the usage of a code-generator produces code separately for each hierarchy of models. The code generated from a specific hierarchy of models performs exactly the same operations that would have been performed by the runtime engine when activated for the same hierarchy of models.

The advantage of code generation is also its disadvantage—once code is generated, it does not change even if the models from which it has been generated are modified, as long as code generation is not performed again. This ensures stability, but reduces the responsiveness to change. In a preferred embodiment of the invention, a runtime engine is used, but choosing code generation is logically equivalent. Both approaches eliminate the need for writing code in any programming language to implement a software application.

Having described the invention with regard to certain specific embodiments thereof, it is to be understood that the description is not meant as a limitation, since further modifications may now suggest themselves to those skilled in the art, and it is intended to cover such modifications as fall within the scope of the appended claims.

We claim:

1. A modeling method for defining software applications by a developer using a visualizable computer executable modeling language, said method comprising:
   providing a plurality of display elements for displaying screen objects on a display screen;
   displaying components corresponding to said screen objects to create an application model using the modeling language by:
      defining each of the software applications as a hierarchy of process models, input and output slots, data models, and flow rules, wherein the components and screen objects are used for defining each of the software applications, the defining of each of the software applications further comprising:
         classifying some of said process models and said data models that must not contain any sub-process as atomic;
         classifying all other process models and data models that contain one or more sub processes as composite;

defining each of said composite process models as a construction of one or more sub process models, said input and output slots, said data models, and said flow rules;

classifying inputs sent to the input slots into mandatory and optional;

defining a portion of said input slots as being one of mandatory and optional, wherein a process that requires an input at each of its mandatory input slots for its initiation, does not start before all said mandatory inputs are received;

defining each of said composite data models as a construction of one or more sub data models;

defining each of said flow rules by connecting a pair selected from said input and output slots, said data models, and the one or more sub data models, wherein said flow rules define both data flow and process flow in the process and data models, wherein said process models, data models, input and output slots, and flow rules are arranged in a structural hierarchy conforming to a set of rigid composition rules;

thus creating the application model as visually defined on the display screen by the developer using the modeling language; and enabling a computer to automatically execute the application model defined in said modeling language without requiring further coding according to the definition of the process models, data models, input and output slots, and flow rules arranged in the hierarchy.

2. The method of claim 1, operating a visualizable computer executable modeling language system for a complete definition of the software applications, said system comprising:

process models, some of which contain any number of sub process models, input and output slots, data models and flow rules;

data models, some of which contain any number of sub data models; and flow rules, each of which connecting a pair of said input and output slots, data models and sub data models, thereby defining said data flows and process flows.

3. The method of claim 2, wherein the modeling language system further comprises at least one visual representation.

4. The method of claim 3, wherein said visual representation comprises:

process diagrams comprising various two dimensional shapes representing said process models;

sub process diagrams comprising various two dimensional shapes contained within said process diagrams, representing said sub process models;

slot diagrams comprising various two dimensional shapes situated on the edges of said process diagrams and said sub process diagrams, representing said input and output slots;

data trees comprising hierarchical tree structures contained within said process diagrams, representing said data models and said sub data models; and flow arrows comprising arrows connecting pairs of said slot diagrams, said data trees and sub-trees of said data tress, said arrows representing said flow rules.

5. The method of claim 2, further defining each of said input slots as having one of the following sub-classifications: synchronous input slot (trigger); and asynchronous input slot; and further defining some of said output slots (exits) as having the sub-classification terminating.

6. The method of claim 2, further defining each of said flow rules contained in said composite process models as connecting one source and one target;

and farther defining the source of each of said flow rules to be one of the following:

an input slot of said composite process models; an output slot (exit) of a sub process model of said composite process models;

a data model of said composite process models; and a sub data model of a data model of said composite process models;

and further defining the target of each of said flow rules to be one of the following:

an exit of said composite process models;

an input slot of a sub process model of said composite process models;

a data model of said composite process models; and a sub data model of a data model of said composite process models.

7. The method of claim 2, wherein:

some of said process models further contain a reference to a database table (process table);

at least some of the sub data models of data models of said process models are marked as interesting fields; and each of said interesting fields further contains a reference to a column of said process table.

8. The method of claim 7, wherein:

a selection condition of an SQL query (addressing clause) can be attached to an input slot of said process models to select matching instances of said process models each time data is to be received by said instances through said input slot;

said addressing clause is defined in terms of a matching condition between the interesting fields of said process models and the data models of said data to be received through said input slot.

9. The method of claim 2, wherein some of said process models further contain a reference to a computer code implementing the function of said process models.

10. The method of claim 2, wherein:

each of said composite data models is composed of said sub data models by one of the following structure means: concatenation; collection; and selection, each of said sub data models having a classification as one of the following: mandatory; and optional; each of said sub data models can be further marked as recurring, with a further optional indication of minimal and maximal number of occurrences;

each of said data models can further contains constraints on the data it defines, comprising at least one of the following: legal characters; and minimal and maximal length;

each of said data models can further comprises a set of legal values and an initial value; and each of said data models can further comprises formatting directives.

11. The method of claim 2 operating a modeling system for defining the software applications using the visualizable computer executable modeling language system, enabling users to create, display, modify and test, in an integrated workspace, models of said modeling language, in accordance with the rules of said modeling language system, wherein said modeling system comprises a graphical user interface tool (visual modeling tool) for creating, displaying, modifying and testing models of said modeling language in an integrated workspace, such that users of said modeling tool create and edit said models using various graphical user interface (GUI) operations.

12. The method of claim 11, wherein each of said process models and said data models is further defined as having one of the following classifications: dependent model which only exists as a sub model of a specific parent model; and reusable model which can be reused as a sub model of multiple parent models, wherein each of said reusable models is assigned a unique identifier.

13. The method of claim 11, wherein models are formally represented as one of the following:
Extensible Markup Language (XML) documents;
structured database records; and any other equivalent binary representation, and wherein a repository of said representations of said models, arranged as a hierarchy of packages and sub-packages (knowledge base), is used to maintain libraries of said models, and wherein the modeling system displays said models whose said representations are stored in said knowledge base, stores in said knowledge base said representations of new said models that are defined by the users of the modeling system, and updates said representations of said models in said knowledge base according to modifications made to said models by said users.

14. The method of claim 11, further comprising at least the following editing capabilities: selection of editing operations from menus; adding components to said models through dragging of models from palettes of existing models; and modifying attributes of said models and components of said models.

15. The method of claim 11, wherein said workspace comprises a drawing board for displaying hierarchies of two dimensional visual diagrams, each representing a corresponding said hierarchy of models, and wherein said users are able to zoom in and out from a currently displayed part of said hierarchy of diagrams, enabling the display of the details of said model and any sub-model thereof at any desired level of said hierarchy of models.

16. The method of claim 11, further comprising: a software program (runtime engine) to execute models defined in said modeling language; and a visual debugger for testing and debugging said models, wherein: said runtime engine, as it executes said models, produces records listing the details of said execution (trace events); said trace events are used to record and store the history of said execution; and said visual debugger uses said stored trace events to display the current status of instances of processes, including the content of their data, as well as the processing steps that have led to said current status.

17. The method of claim 2, enabling a runtime engine to execute the applications defined in the visualizable computer executable modeling language system, wherein each of the applications is defined by a single said process model and a hierarchy of its sub-models; and the runtime engine executes each application exactly as defined by said single process model and said hierarchy of its sub-models, thus eliminating the need for writing computer source code in any programming language to implement each application.

18. The method of claim 17, wherein the runtime engine farther employs: active models comprising objects responsible for representing and enacting the definitions and rules embodied in said models, where there is an active model corresponding to each of said process models and data models; runtime objects comprising objects containing the runtime state of instances of said process models and data models, where there may be at any time any number of runtime objects instantiated from each of said process models and data models by the corresponding said active model; and a model loader comprising an object responsible for loading said models from their formal representations stored in a repository, converting said loaded models to corresponding said active models, and caching said active models.

19. The method of claim 17, wherein the runtime engine executes each of said models as a series of processing steps, wherein: each of said processing steps is triggered by the receipt of an external input; the runtime engine invokes at least one instance of at least one relevant process model to handle said received input, and executes sub-processes of said invoked processes as defined by the relevant said flow rules; and a processing step ends when any farther activities to be performed depend on the receipt of other external inputs.

20. The method of claim 17, wherein the runtime engine executes each of said models as a series of processing steps by invoking at least one instance of said process models; the full state of each of said at least one process instance is made persistent at the end of each said-processing step; execution of each of said at least one process instance can resume from its stored state at any relevant time; and a repository of all said at least one process instances is available for queries and retrieval by the runtime engine while executing said models or by external applications.

21. The method of claim 2, further comprising:
defining each of the applications by a single said process model and a hierarchy of its sub-models; and
generating code in a general purpose programming language implementing the application exactly as defined by said single process model and said hierarchy of its sub-models, thus eliminating the need for writing computer source code in any programming language to implement the application.

22. The method of claim 21, wherein said general purpose programming language is JAVA.

23. The method of claim 21, wherein said general purpose programming language is C++.

24. A method for overcoming the need to write computer source code in order to develop software applications, comprising:
creating models of the applications in a visualizable computer executable modeling language system, using a visual modeling tool, comprising:
defining each of said software applications as a hierarchy of process models, input and output slots, data models and flow rules, wherein the components and screen objects are used for defining each of the software applications, the defining step further comprising:
classifying some of said process models and said data models that must not contain any sub-process as atomic;
classifying all other process models and data models that contain one or more sub processes as composite;
defining each of said composite process models as a construction of one or more sub process models, said input and output slots, said data models, and said flow rules;
classifying inputs sent to the input slots into mandatory and optional;
defining a portion of said input slots as being one of mandatory and optional, wherein a process that requires an input at each of its mandatory input slots for its initiation does not start before all said mandatory inputs are received;
defining each of said composite data models as a construction of one or more sub data models;

defining each of said flow rules by connecting a pair selected from said input and output slots, said data models, and the one or more sub data models, wherein said flow rules define both data flow and process flow in the process and data models; and automatically executing the logic defined by said created models without requiring further coding, wherein said process models, data models, input and output slots, and flow rules are arranged in a structural hierarchy conforming to a set of rigid composition rules.

25. The method of claim 24, wherein the execution of the logic defined by said models is made by a runtime engine.

26. The method of claim 24, wherein the implementation of the logic defined by said models is made by the source code in a general purpose programming language, which is generated by a code generator.

27. A software development platform having a processor for overcoming the need to write computer source code in order to develop software applications, comprising:

a visualizable computer executable modeling language for the definition of software applications, said definition developed by performing the steps of:

defining each of said software applications in a hierarchy of process models, input and output slots, data models, and flow rules, wherein said process models, input and output slots, data models and flow rules are used for defining each of the software applications, the defining step further comprising:

classifying some of said process models and said data models that must not contain any sub-process as atomic;

classifying all other process models and data models that contain one or more sub processes as composite;

defining each of said composite process models as a construction of one or more sub process models, said input and output slots, said data models, and said flow rules;

classifying inputs sent to the input slots into mandatory and optional;

defining a portion of said input slots as being one of mandatory and optional, wherein a process that requires an input at each of its mandatory input slots for its initiation does not start before all said mandatory inputs are received;

defining each of said composite data models as a construction of one or more sub data models; and defining each of said flow rules by connecting a pair selected from said input and output slots, said data models, and the one or more sub data models, wherein said flow rules define both data flow and process flow in the process and data models;

a visual modeling tool for defining said software applications by at least one user as said hierarchies of models in said modeling language; and a dedicated computer program to automatically execute said software applications without requiring further coding according to the logic defined by said hierarchies of models, wherein said process models, data models, input and output slots, and flow rules are arranged in a structural hierarchy conforming to a set of rigid composition rules.

28. The software development platform of claim 27, wherein said dedicated computer program is a runtime engine that automatically executes said software applications at runtime, according to the logic defined by said hierarchies of models.

29. The software development platform of claim 27, wherein said dedicated computer program is a code generator that automatically generates the source code in a general purpose programming language implementing the logic defined by said hierarchies of models.

30. A computer program product comprising memory having computer readable code embodied therein for execution on a computer, said memory storing instructions that, when executed by the computer, cause the computer to perform a modeling method for defining software applications using a visualizable computer executable modeling language, said method comprising:

providing a plurality of display elements for displaying screen objects on a display screen;

displaying components corresponding to said screen objects to create an application model using the modeling language by:

defining each of the software applications as a hierarchy of process models, input and output slots, data models, and flow rules, wherein the components and screen objects are used for defining each of the software applications, the defining step farther comprising:

classifying some of said process models and said data models that must not contain any sub process as atomic;

classifying all other process models and data models that contain one or more sub processes as composite;

defining each of said composite process models as a construction of one or more sub process models, said input and output slots, said data models, and said flow rules;

classifying inputs sent to the input slots into mandatory and optional;

defining a portion of said input slots as being one of mandatory and optional, wherein a process that requires an input at each of its mandatory input slots for its initiation, does not start before all said mandatory inputs are received;

defining each of said composite data models as a construction of one or more sub data models; and defining each of said flow rules by connecting a pair selected from said input and output slots, said data models, and the one or more sub data models, wherein said flow rules define both data flow and process flow in the process and data models, wherein said process models, data models, input and output slots, and flow rules are arranged in a structural hierarchy conforming to a set of rigid composition rules;

thus creating the application model as visually defined on the display screen by the developer using the modeling language; and enabling a computer to automatically execute the application model defined in said modeling language without requiring further coding according to the definition of the process models, data models, input and output slots, and flow rules arranged in the hierarchy.

* * * * *